United States Patent
Sin

(10) Patent No.: US 12,487,433 B2
(45) Date of Patent: Dec. 2, 2025

(54) OPTICAL SYSTEM COMPRISING FIRST TO SEVENTH LENSES SEQUENTIALLY ARRANGED ALONG AN OPTICAL AXIS AND CAMERA MODULE COMPRISING THE SAME

(71) Applicant: LG INNOTEK CO., LTD., Seoul (KR)

(72) Inventor: Doo Shik Sin, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 281 days.

(21) Appl. No.: 18/256,779

(22) PCT Filed: Dec. 10, 2021

(86) PCT No.: PCT/KR2021/018755
§ 371 (c)(1),
(2) Date: Jun. 9, 2023

(87) PCT Pub. No.: WO2022/124850
PCT Pub. Date: Jun. 16, 2022

(65) Prior Publication Data
US 2024/0027732 A1     Jan. 25, 2024

(30) Foreign Application Priority Data
Dec. 10, 2020 (KR) .................. 10-2020-0172522

(51) Int. Cl.
*G02B 9/64*     (2006.01)

(52) U.S. Cl.
CPC ..................... *G02B 9/64* (2013.01)

(58) Field of Classification Search
None
See application file for complete search history.

(56) References Cited

U.S. PATENT DOCUMENTS

| | | | |
|---|---|---|---|
| 11,867,885 | B2 | 1/2024 | Son et al. |
| 11,914,223 | B2 | 2/2024 | Sun |

(Continued)

FOREIGN PATENT DOCUMENTS

| | | |
|---|---|---|
| CN | 111736302 A | 10/2020 |
| CN | 111736309 A | 10/2020 |

(Continued)

OTHER PUBLICATIONS

International Search Report dated Apr. 8, 2022 in International Application No. PCT/KR2021/018755.

(Continued)

*Primary Examiner* — Paul C Lee
(74) *Attorney, Agent, or Firm* — Saliwanchik, Lloyd & Eisenschenk

(57) ABSTRACT

An optical system disclosed to an embodiment of the invention includes first to seventh lenses sequentially arranged along an optical axis from the object side to the image side, wherein the first lens has a negative refractive power, and the third lens has a positive refractive power The object-side surface of the first lens may be concave, the object-side surface and the image-side surface of the third lens may be convex, and the third lens may be satisfied the following Equation 1: $0.5<f3/F<1.5$ (In Equation 1, F denotes an effective focal length of the optical system, and f3 denotes a focal length of the third lens).

20 Claims, 7 Drawing Sheets

(56) References Cited

U.S. PATENT DOCUMENTS

| | | | |
|---|---|---|---|
| 12,140,738 B2 | 11/2024 | Son et al. | |
| 2019/0204551 A1 | 7/2019 | Oinuma et al. | |
| 2019/0227282 A1 | 7/2019 | Son et al. | |
| 2019/0369361 A1 | 12/2019 | Yoo et al. | |
| 2019/0369367 A1* | 12/2019 | Park | G02B 7/021 |
| 2019/0369368 A1* | 12/2019 | Jung | G02B 7/022 |
| 2020/0103620 A1 | 4/2020 | Kim et al. | |
| 2020/0355889 A1 | 11/2020 | Hayashi et al. | |
| 2020/0409058 A1* | 12/2020 | Oinuma | G02B 9/64 |
| 2021/0271053 A1* | 9/2021 | Hu | G02B 9/64 |
| 2021/0389558 A1* | 12/2021 | Son | G02B 9/64 |
| 2022/0011547 A1* | 1/2022 | Sun | G02B 13/0045 |
| 2022/0283406 A1 | 9/2022 | Lee | |
| 2025/0013017 A1 | 1/2025 | Son et al. | |

FOREIGN PATENT DOCUMENTS

| | | |
|---|---|---|
| CN | 111650731 B | 11/2020 |
| CN | 111913285 A | 11/2020 |
| CN | 112034600 A | 12/2020 |
| JP | 2019-120917 A | 7/2019 |
| JP | 2020-187181 A | 11/2020 |
| KR | 10-2017-0045556 A | 4/2017 |
| KR | 10-2020-0036395 A | 4/2020 |
| KR | 10-2122243 B1 | 6/2020 |

OTHER PUBLICATIONS

Office Action dated Sep. 10, 2025 in Taiwanese Application No. 110146415.

\* cited by examiner

OPTICAL SYSTEM COMPRISING FIRST TO SEVENTH LENSES SEQUENTIALLY ARRANGED ALONG AN OPTICAL AXIS AND CAMERA MODULE COMPRISING THE SAME

CROSS-REFERENCE TO RELATED APPLICATIONS

This application is the U.S. national stage application of International Patent Application No. PCT/KR2021/018755, filed Dec. 10, 2021, which claims the benefit under 35 U.S.C. § 119 of Korean Application No. 10-2020-0172522, filed Dec. 10, 2020, the disclosures of each of which are incorporated herein by reference in their entirety.

TECHNICAL FIELD

An embodiment relates to an optical system for improved optical efficiency and a camera module including the same.

BACKGROUND ART

The camera module captures an object and stores it as an image or video, and is installed in various applications. In particular, the camera module is produced in a very small size and is applied to not only portable devices such as smartphones, tablet PCs, and laptops, but also drones and vehicles to provide various functions. For example, the optical system of the camera module may include an imaging lens for forming an image, and an image sensor for converting the formed image into an electrical signal. In this case, the camera module may perform an autofocus (AF) function of aligning the focal lengths of the lenses by automatically adjusting the distance between the image sensor and the imaging lens, and may perform a zooning function of zooming up or zooning out by increasing or decreasing the magnification of a remote object through a zoom lens. In addition, the camera module employs an image stabilization (IS) technology to correct or inhibit image stabilization due to an unstable fixing device or a camera movement caused by a user's movement. The most important element for this camera module to obtain an image is an imaging lens that forms an image. Recently, interest in high efficiency such as high image quality and high resolution is increasing, and research on an optical system including plurality of lenses is being conducted in order to realize this. For example, research using a plurality of imaging lenses having positive (+) and/or negative (−) refractive power to implement a high-efficiency optical system is being conducted.

However, when a plurality of lenses is included, there is a problem in that it is difficult to derive excellent optical properties and aberration properties. In addition, when a plurality of lenses is included, the overall length, height, etc. may increase due to the thickness, interval, size, etc. of the plurality of lenses, thereby increasing the overall size of the module including the plurality of lenses. Therefore, a new optical system capable of solving the above problems is required.

DISCLOSURE

Technical Problem

The embodiment provides an optical system with improved optical properties. The embodiment provides an optical system capable of reducing the size.

Technical Solution

An optical system according to an embodiment of the invention comprises first to seventh lenses sequentially arranged along an optical axis from an object side to an image side direction, wherein the first lens has a negative refractive power, the third lens has a positive refractive power, and an object-side surface of the first lens may be concave, each of an object-side surface and an image-side surface of the third lens may be convex, and the third lens may be satisfied the following Equation 1:

$$0.5 < f3/F < 1.5 \qquad \text{[Equation 1]}$$

(In Equation 1, F denotes an effective focal length of the optical system, and f3 denotes a focal length of the third lens).

According to an embodiment of the invention, wherein the fourth lens may have negative refractive power, and an image-side surface of the fourth lens may be concave.

According to an embodiment of the invention, wherein the third and fourth lenses may be satisfied the following Equation 2:

$$1 < L3\_CT/L4\_CT < 5 \qquad \text{[Equation 2]}$$

(In an Equation 2, L3_CT means a center thickness of the third lens, and L4_CT means a center thickness of the fourth lens).

According to an embodiment of the invention, wherein the third and fourth lenses may be satisfied the following Equation 3:

$$1 < |f4|/|f3| < 5 \qquad \text{[Equation 3]}$$

(In Equation 3, f 3 is a focal length of the third lens, and f4 is a focal length of the fourth lens).

According to an embodiment of the invention, wherein the sixth lens may have positive refractive power, and an image-side surface of the sixth lens may be convex. The seventh lens may have negative refractive power, and an image-side surface of the seventh lens may be concave.

According to an embodiment of the invention, wherein the fourth and sixth lenses may be satisfied the following Equation 4:

$$1 < L6\_CT/L4\_CT < 5 \qquad \text{[Equation 4]}$$

(In Equation 4, L4_CT means a center thickness of the fourth lens, and L6_CT means a center thickness of the sixth lens).

According to an embodiment of the invention, wherein the sixth and seventh lenses may be satisfied the following Equation:

$$0.5 < |f6|/|f7| < 2 \qquad \text{[Equation 5]}$$

(In Equation 5, f6 means a focal length of the sixth lens, and f7 means a focal length of the seventh lens).

An optical system according to an embodiment of the invention comprises first to seventh lenses sequentially arranged along an optical axis from an object side to an image side, wherein the first lens has a negative refractive power, and the third lens has a positive refractive power, each of an object-side surface and an image-side surface of the first lens is concave, each of an object-side surface and an image-side surface of the third lens is convex, and the first lens is includes a first inflection point disposed on an object-side surface, wherein the first inflection point may be disposed at position of 25% to 60% with respect to a direction perpendicular to the optical axis when the optical axis is a starting point and an end of the object-side surface of the first lens is an end point.

According to an embodiment of the invention, at least one of the object-side surface and the image-side surface of the seventh lens may include an inflection point. The seventh lens includes a second inflection point disposed on the object-side surface, and the second inflection point may be disposed at a position of 25% to 55% with respect to a direction perpendicular to the optical axis when the optical axis is a starting point and an end of the object-side surface of the seventh lens is an end point.

According to an embodiment of the invention, the seventh lens includes a third inflection point disposed on the image-side surface, and the third inflection point may be arranged at a position of 55% to 90% with respect to a direction perpendicular to the optical axis when the optical axis is a starting point and an end of the image-side surface of the seventh lens is an end point. A distance between the optical axis and the third inflection point may be greater than a distance between the optical axis and the second inflection point.

Advantageous Effects

The optical system and the camera module according to the embodiment may have improved optical properties. In detail, the optical system and the camera module may be satisfied at least one of a plurality of equations, thereby controlling the incident light incident on the optical system. Accordingly, the optical system and the camera module may improve aberration characteristics and distortion characteristics, and may have improved resolution. The optical system according to the embodiment may have a slim structure. Accordingly, the device including the optical system, for example, the camera module may be provided to be slimmer and more compact.

BEST MODE

Figure 1:
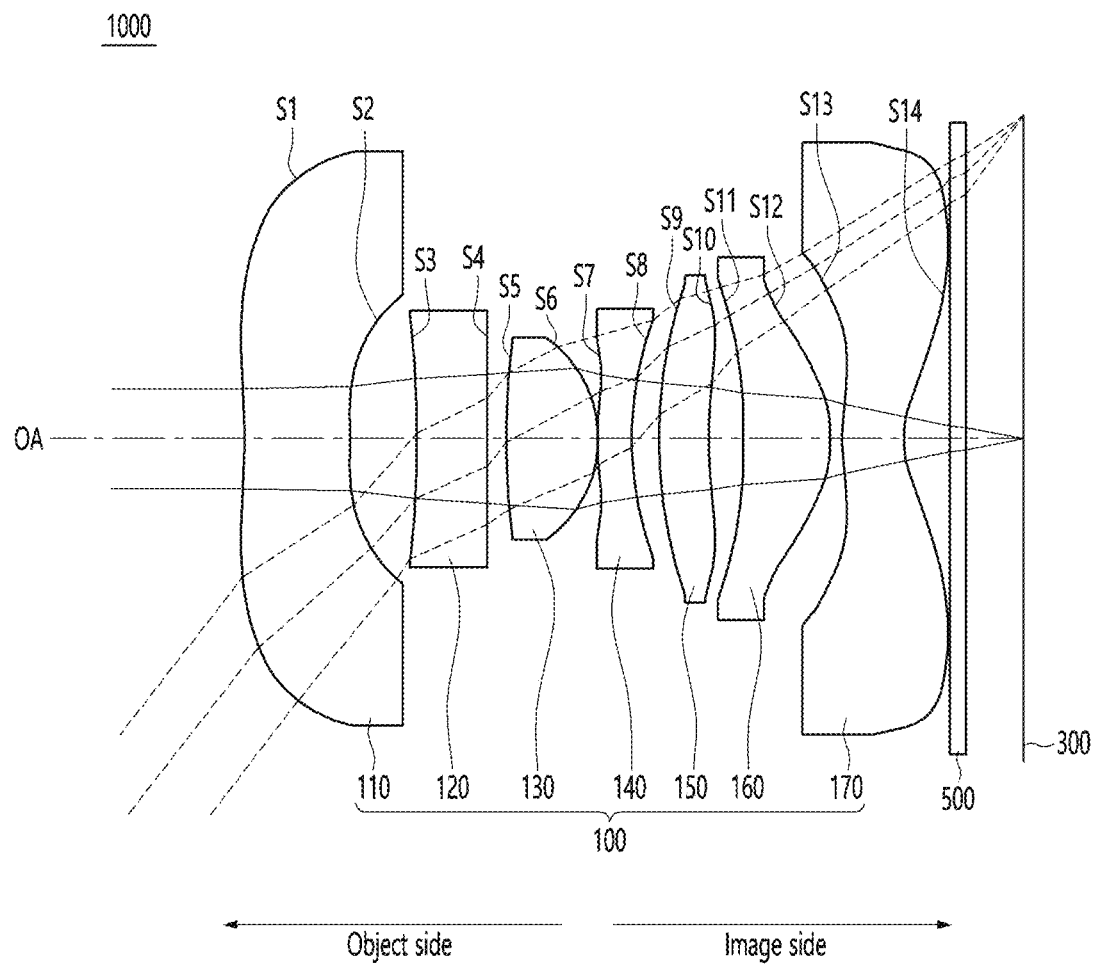
FIG. 1 is a block diagram of an optical system according to a first embodiment.

Hereinafter, preferred embodiments of the invention will be described in detail with reference to the accompanying drawings. A technical spirit of the invention is not limited to some embodiments to be described, and may be implemented in various other forms, and one or more of the components may be selectively combined and substituted for use within the scope of the technical spirit of the invention. In addition, the terms (including technical and scientific terms) used in the embodiments of the invention, unless specifically defined and described explicitly, may be interpreted in a meaning that may be generally understood by those having ordinary skill in the art to which the invention pertains, and terms that are commonly used such as terms defined in a dictionary should be able to interpret their meanings in consideration of the contextual meaning of the relevant technology. Further, the terms used in the embodiments of the invention are for explaining the embodiments and are not intended to limit the invention. In this specification, the singular forms also may include plural forms unless otherwise specifically stated in a phrase, and in the case in which at least one (or one or more) of A and (and) B, C is stated, it may include one or more of all combinations that may be combined with A, B, and C. In describing the components of the embodiments of the invention, terms such as first, second, A, B, (a), and (b) may be used. Such terms are only for distinguishing the component from other component, and may not be determined by the term by the nature, sequence or procedure etc. of the corresponding constituent element. And when it is described that a component is "connected", "coupled" or "joined" to another component, the description may include not only being directly connected, coupled or joined to the other component but also being "connected", "coupled" or "joined" by another component between the component and the other component. In addition, in the case of being described as being formed or disposed "above (on)" or "below (under)" of each component, the description includes not only when two components are in direct contact with each other, but also when one or more other components are formed or disposed between the two components. In addition, when expressed as "above (on)" or "below (under)", it may refer to a downward direction as well as an upward direction with respect to one element.

The convex surface of the lens may mean that the lens surface of the region corresponding to the optical axis has a convex shape, and the concave lens surface means that the lens surface of the region corresponding to the optical axis has a concave shape. In addition, "object-side surface" may mean the surface of the lens facing the object side with respect to the optical axis, and "image-side surface" may mean the surface of the lens toward the imaging surface with respect to the optical axis. In addition, the vertical direction may mean a direction perpendicular to the optical axis, and the end of the lens or the lens surface may mean the end of the effective region of the lens through which the incident light passes.

The optical system 1000 according to the embodiment may include a plurality of lenses 100 and an image sensor 300. For example, the optical system 1000 according to the embodiment may include five or more lenses. In detail, the optical system 1000 may include seven lenses. That is, the optical system 1000 includes a first lens 110, a second lens 120, a third lens 130, a fourth lens 140, a fifth lens 150, a sixth lens 160, a seventh lens 170 and an image sensor 300 which are sequentially arranged from the object side to the image side or the sensor side. The first to seventh lenses 110, 120, 130, 140, 150, 160, and 170 may be sequentially disposed along the optical axis OA of the optical system 1000. The light corresponding to the information of the object may incident on the image sensor 300 through the first lens 110, the second lens 120, the third lens 130, the fourth lens 140, the fifth lens 150, the sixth lens 160 and the seventh lens 170. Each of the plurality of lenses 100 may include an effective region and an ineffective region. The effective region may be a region through which light incident on each of the first to seventh lenses 110, 120, 130, 140, 150, 160 and 170 passes. That is, the effective region may be a region in which incident light is refracted to realize optical properties. The ineffective region may be disposed around the effective region. The ineffective region may be a region to which the light is not incident. That is, the ineffective region may be a region independent of the optical characteristic. Also, the ineffective region may be a region fixed to a barrel (not shown) for accommodating the lens.

The image sensor 300 may detect light. In detail, the image sensor 300 detects light sequentially passing through the plurality of lenses 100, in detail, the first to seventh lenses 110, 120, 130, 140, 150, 160, and 170. The image sensor 300 may include a charge coupled device (CCD) or a complementary metal oxide semiconductor (CMOS). The optical system 1000 according to the embodiment may further include a filter 500. The filter 500 may be disposed between the plurality of lenses 100 and the image sensor 300. The filter 500 may be disposed between the last lens (a seventh lens 170) closest to the image sensor 300 among the plurality of lenses 100 and the image sensor 300. The filter 500 may include at least one of an infrared filter and an optical filter such as a cover glass. The filter 500 may pass light of a set wavelength band and filter light of a different wavelength band. When the filter 500 includes an infrared filter, radiant heat emitted from external light may be blocked from being transmitted to the image sensor 300. Also, the filter 500 may transmit visible light and reflect infrared light.

Also, the optical system 1000 according to the embodiment may include an aperture stop (not shown). The aperture stop may control the amount of light incident on the optical system 1000. The aperture stop may be positioned in front of the first lens 110 or disposed between two lenses selected from among the first to seventh lenses 110, 120, 130, 140, 150, 160 and 170. For example, the aperture stop may be disposed between the second lens 120 and the third lens 130. Also, at least one of the first to seventh lenses 110, 120, 130, 140, 150, 160, and 170 may function as an aperture stop. For example, the object-side surfaces or image-side surfaces of one lens selected from among the first to seventh lenses 110, 120, 130, 140, 150, 160 and 170 serves as an aperture stop for controlling the amount of light. For example, the object-side surface (a five surface S5) of the third lens 130 may serve as an aperture stop.

The optical system 1000 according to the embodiment may further include a light path changing member (not shown). The light path changing member may change the path of the light by reflecting the light incident from the outside. The light path changing member may include a reflector and a prism. For example, the light path changing member may include a right-angle prism. When the light path changing member includes a right-angle prism, the light path changing member may change the path of the light by reflecting the path of the incident light at an angle of 50 degrees. The light path changing member may be disposed closer to the object side than the first to seventh lenses 110, 120, 130, 140, 150, 160, and 170. That is, when the optical system 1000 includes the optical path changing member, the optical path changing member, the first lens 110, the second lens 120, and the third lens 130, the fourth lens 140, the fifth lens 150, the sixth lens 160, the seventh lens 170, the filter 500, and the image sensor 300 may be disposed in order from the object side to the image side direction. The light path changing member may reflect light incident from the outside to change the path of the light in a set direction. The light path changing member may reflect the light incident on the light path changing member to change the path of the light toward the first to seventh lenses 110, 120, 130, 140, 150, 160, and 170. When the optical system 1000 includes a light path changing member, the optical system may be applied to a folded camera capable of reducing the thickness of the camera. In detail, when the optical system 1000 includes the light path changing member, light incident in a direction perpendicular to the surface of the applied device may be changed in a direction parallel to the surface of the device. Accordingly, the optical system 1000 including the plurality of lenses may have a thinner thickness in the device, and thus the device may be provided thinner. In more detail, when the optical system 1000 does not include the light path changing member, the plurality of lenses may be disposed to extend in a direction perpendicular to the surface of the device in the device. Accordingly, the optical system 1000 including the plurality of lenses may have a high height in a direction perpendicular to the surface of the device, and it may be difficult to form a thin thickness of the device.

However, when the optical system 1000 includes the light path changing member, it may be applied to a folded camera, and the plurality of lenses may be arranged to extend in a direction parallel to the surface of the device. That is, the optical system 1000 may be disposed such that the optical axis OA is parallel to the surface of the device. Accordingly, the optical system 1000 including the plurality of lenses may have a low height in a direction perpendicular to the surface of the device. Accordingly, the folded camera including the optical system 1000 may have a thin thickness in the device, and the thickness of the device may also be reduced.

The light path changing member may be provided in plurality. For example, the light path changing member may include a first light path changing member disposed between the object and the plurality of lenses 100. Also, the light path changing member may include a second light path changing member disposed between the plurality of lenses 100 and the image sensor 300. That is, the first light path changing member, the plurality of lenses 100, the second light path changing member, and the image sensor 300 may be disposed in order from the object side to the image side, and the plurality of light path changing members may be arranged in an order. The member may be arranged in the form of a periscope. The first light path changing member may change the path of the light by reflecting the path of the incident light incident on the optical system 1000 at an angle of 90 degrees. In detail, the first light path changing member may change the path of the incident light toward the plurality of lenses 100 by reflecting the path of the incident light incident in the first direction in a second direction perpendicular to the first direction. In addition, the second light path changing member may reflect the path of the light passing through the plurality of lenses 100 in the first direction again to change the direction of the image sensor 300.

Accordingly, the image sensor 300 may be disposed to extend in a direction different from the disposition direction of the plurality of lenses 100, and thus the optical system 1000 may be implemented in a smaller size. In detail, when there is no second optical path changing member between the plurality of lenses 100 and the image sensor 300, the image sensor 300 may be disposed to extend in a direction perpendicular to the optical axis OA of the plurality of lenses 100. In this case, when the size of the image sensor 300 increases, there is a problem in that the overall thickness (second direction) of the optical system 1000 increases.

However, when the second optical path changing member is further disposed between the plurality of lenses 100 and the image sensor 300, the image sensor 300 may be disposed to extend in a parallel direction to the optical axis OA of the plurality of lenses 100. That is, even when the size of the image sensor 300 increases, the overall thickness (second direction) of the optical system 1000 does not increase, so that the optical system 1000 may be provided in a slimmer shape.

Hereinafter, the plurality of lenses 100 will be described in more detail.

The first lens 110 may have negative (−) refractive power. The first lens 110 may include a plastic or glass material. For example, the first lens 110 may be made of a plastic material.

The first lens 110 may include a first surface S1 defined as an object-side surface and a second surface S2 defined as an image-side surface. The first surface S1 may be concave, and the second surface S2 may be concave. That is, the first lens 110 may have a shape in which both surfaces are concave. Hereinafter, the image side or the image-side surface may be a sensor side or a sensor-side surface. At least one of the first surface S1 and the second surface S2 may be an aspherical surface. For example, both the first surface S1 and the second surface S2 may be aspherical. The first lens 110 may include at least one inflection point. In detail, at least one of the first surface S1 and the second surface S2 may include an inflection point.

For example, the first surface S1 may include a first inflection point (not shown) defined as an inflection point. The first inflection point may be disposed at a position about 60% or less when the optical axis OA is a starting point and an end point of the first surface S1 of the first lens 110 is an end point. In detail, the first inflection point may be disposed at a position of about 25% to about 60% when the optical axis OA is the starting point and the end of the first surface S1 of the first lens 110 is the endpoint. In more detail, the first inflection point may be disposed at a position of about 35% to about 55% when the optical axis OA is the starting point and the end of the first surface S1 of the first lens 110 is the endpoint. Here, the end of the first surface S1 may mean the end of the effective region of the first surface S1 of the first lens 110, and the position of the first inflection point may be a position set with respect to a vertical direction of the optical axis OA.

The second lens 120 may have positive (+) or negative (−) refractive power. The second lens 120 may include a plastic or glass material. For example, the second lens 120 may be made of a plastic material. The second lens 120 may include a third surface S3 defined as an object-side surface and a fourth surface S4 defined as an image-side surface. The third surface S3 may be convex, and the fourth surface S4 may be concave. That is, the second lens 120 may have a meniscus shape convex toward the object side. Alternatively, the third surface S3 may be convex, and the fourth surface S4 may be convex. That is, the second lens 120 may have a shape in which both surfaces are convex. Alternatively, the third surface S3 may be concave, and the fourth surface S4 may be convex. That is, the second lens 120 may have a meniscus shape convex toward the image side. Alternatively, the third surface S3 may be concave, and the fourth surface S4 may be concave. That is, the second lens 120 may have a shape in which both surfaces are concave. At least one of the third surface S3 and the fourth surface S4 may be an aspherical surface. For example, both the third surface S3 and the fourth surface S4 may be aspherical.

The third lens 130 may have positive (+) refractive power. The third lens 130 may include a plastic or glass material. For example, the third lens 130 may be made of a plastic material. The third lens 130 may include a fifth surface S5 defined as an Object-side surface and a sixth surface S6 defined as an image-side surface. The fifth surface S5 may be convex, and the sixth surface S6 may be convex. That is, the third lens 130 may have a shape in which both surfaces are convex. At least one of the fifth surface S5 and the sixth surface S6 may be an aspherical surface. For example, both the fifth surface S5 and the sixth surface S6 may be aspherical.

The fourth lens 140 may have negative (−) refractive power. The fourth lens 140 may include a plastic or glass material. For example, the fourth lens 140 may be made of a plastic material. The fourth lens 140 may include a seventh surface S7 defined as an object-side surface and an eighth surface S8 defined as an image-side surface. The seventh surface S7 may be convex, and the eighth surface S8 may be concave. That is, the fourth lens 140 may have a meniscus shape convex toward the object side. Alternatively, the seventh surface S7 may be concave, and the eighth surface S8 may be concave. That is, the fourth lens 140 may have a shape in which both surfaces are concave. At least one of the seventh surface S7 and the eighth surface S8 may be an aspherical surface. For example, both the seventh surface S7 and the eighth surface S8 may be aspherical.

The fifth lens 150 may have positive (+) or negative (−) refractive power. The fifth lens 150 may include a plastic or glass material. For example, the fifth lens 150 may be made of a plastic material. The fifth lens 150 may include a ninth surface S9 defined as an object-side surface and a tenth surface S10 defined as an image-side surface. The ninth surface S9 may be convex, and the tenth surface S10 may be concave. That is, the fifth lens 150 may have a meniscus shape convex toward the object side. Alternatively, the ninth surface S9 may be convex, and the tenth surface S10 may be convex. That is, the fifth lens 150 may have a shape in which both surfaces are convex. Alternatively, the ninth surface S9 may be concave, and the tenth surface S10 may be convex. That is, the fifth lens 150 may have a meniscus shape convex toward the image side. Alternatively, the ninth surface S9 may be concave, and the tenth surface S10 may be concave. That is, the fifth lens 150 may have a shape in which both surfaces are concave. At least one of the ninth surface S9 and the tenth surface S10 may be an aspherical surface. For example, both the ninth surface S9 and the tenth surface S10 may be aspherical.

The sixth lens 160 may have positive (+) refractive power. The sixth lens 160 may include a plastic or glass material. For example, the sixth lens 160 may be made of a plastic material. The sixth lens 160 may include an eleventh surface S11 defined as an object-side surface and a twelfth surface S12 defined as an image-side surface. The eleventh surface S11 may be convex, and the twelfth surface S12 may be convex. That is, the sixth lens 160 may have a shape in which both surfaces are convex. Also, the eleventh surface S11 may be concave, and the twelfth surface S12 may be convex. That is, the sixth lens 160 may have a meniscus shape convex toward the image side. At least one of the eleventh surface S11 and the twelfth surface S12 may be an aspherical surface. For example, both the eleventh surface S11 and the twelfth surface S12 may be aspherical.

The seventh lens 170 may have negative (−) refractive power. The seventh lens 170 may include a plastic or glass material. For example, the seventh lens 170 may be made of a plastic material. The seventh lens 170 may include a thirteenth surface S13 defined as an object-side surface and a fourteenth surface S14 defined as an image-side surface. The thirteenth surface S13 may be convex, and the fourteenth surface S14 may be concave. That is, the seventh lens 170 may have a meniscus shape convex toward the object side. Alternatively, the thirteenth surface S13 may be concave, and the fourteenth surface S14 may be concave. That is, the seventh lens 170 may have a shape in which both surfaces are concave. At least one of the thirteenth surface S13 and the fourteenth surface S14 may be an aspherical surface. For example, both the thirteenth surface S13 and the fourteenth surface S14 may be aspherical.

The seventh lens 170 may include at least one inflection point. In detail, at least one of the thirteenth surface S13 and the fourteenth surface S14 may include an inflection point. For example, the thirteenth surface S13 may include a second inflection point (not shown) defined as an inflection point. The second inflection point may be disposed at a position about 55% or less when the optical axis OA is the starting point and the end of the thirteenth surface S13 of the seventh lens 170 is the endpoint. In detail, the second inflection point may be disposed at a position of about 25% to about 55% when the optical axis OA is the starting point and the end of the thirteenth surface S13 of the seventh lens 170 is the end point. In more detail, when the second inflection point may be disposed at a position of about 30% to about 50% when the optical axis OA is the starting point and the end of the thirteenth surface S13 of the seventh lens 170 is the end point. Here, the end of the thirteenth surface S13 may mean the end of the effective region of the thirteenth surface S13 of the seventh lens 170, and the position of the second inflection point may be a positioned set with respect to a vertical direction of the optical axis OA.

The fourteenth surface S14 may include a third inflection point (not shown) defined as an inflection point. The third inflection point may be disposed at a position about 90% or less when the optical axis OA is the starting point and the end of the fourteenth surface S14 of the seventh lens 170 is the end point. In detail, the third inflection point may be disposed at a position of about 55% to about 90% when the optical axis OA is the starting point and the end of the fourteenth surface S14 of the seventh lens 170 is the endpoint. In more detail, when the third inflection point may be disposed at a position of about 60% to about 80% when the optical axis OA is the starting point and the end of the fourteenth surface S14 of the seventh lens 170 is the end point. Here, the end of the fourteenth surface S14 may mean the end of the effective region of the fourteenth surface S14 of the seventh lens 170, and the position of the third inflection point may be a position set with respect to a vertical direction of the optical axis OA. In this case, the third inflection point may be located at a greater distance than the second inflection point with respect to the optical axis OA. In detail, a distance between the optical axis OA and the third inflection point in a vertical direction of the optical axis OA may be greater than a distance between the optical axis OA and the second inflection point.

The optical system 1000 according to the embodiment may be satisfied at least one of the following equations. Accordingly, the optical system 1000 according to the embodiment may have an optically improved effect. Also, the optical system 1000 according to the embodiment may have a slimmer structure.

$$0.5 < f3/F < 2 \quad \text{[Equation 1]}$$

In Equation 1, F means an effective focal length of the optical system 1000, and f3 means a focal length of the third lens 130. In detail, [Equation 1] may be satisfied: $0.5 < f3/F < 1.5$, in consideration of resolution improvement. In more detail, [Equation 1] may be satisfied: $0.7 < f3/F < 1.3$.

$$0.5 < L1\_CT/L2\_CT < 2.5 \quad \text{[Equation 2]}$$

In Equation 2, L1_CT means a center thickness of the first lens 110, and L2_CT means a center thickness of the second lens 120.

$$0 < L2\_CT/L3\_CT < 1 \quad \text{[Equation 3]}$$

In Equation 2, L2_CT means a center thickness of the second lens 120, and L3_CT means a center thickness of the third lens 130.

$$1 < L3\_CT/L4\_CT < 5 \quad \text{[Equation 4]}$$

In Equation 4, L3_CT means a center thickness of the third lens 130, and L4_CT means a center thickness of the fourth lens 140. In detail, [Equation 4] may be satisfied: $1.5 < L3\_CT/L4\_CT < 3.5$, in consideration of distortion reduction. In more detail, Equation 4 may be satisfied: $1.8 < L3\_CT/L4\_CT < 3.3$.

$$1 < L6\_CT/L4\_CT < 5 \quad \text{[Equation 5]}$$

In Equation 5, L4_CT means a center thickness of the fourth lens 140, and L6_CT means a center thickness of the sixth lens 160. In detail, Equation 5 may be satisfied $1.5 < L6\_CT/L4\_CT < 3.5$, in consideration of distortion reduction. In more detail, Equation 5 may be satisfied: $1.8 < L6\_CT/L4\_CT < 3.3$.

$$10 < d23/d34 < 100 \quad \text{[Equation 6]}$$

In Equation 6, d23 means the center distance between the second lens 120 and the third lens 130, and d34 means the center distance between the third lens 130 and the fourth lens 140.

$$3 < L3\_CT/d23 < 5.5 \quad \text{[Equation 7]}$$

In Equation 7, L3_CT means a center thickness of the third lens 130, and d23 means a center distance between the second lens 120 and the third lens 130.

$$30 < L3\_CT/d34 < 550 \quad \text{[Equation 8]}$$

In Equation 8, L3_CT means a center thickness of the third lens 130, and d34 means a center distance between the third lens 130 and the fourth lens 140.

$$10 < L4\_CT/d34 < 200 \quad \text{[Equation 9]}$$

In Equation 9, L4_CT means a center thickness of the fourth lens 140, and d34 means a center distance between the third lens 130 and the fourth lens 140.

$$0.8 < (SD\ L1S1)/(SD\ L7S2) < 1 \quad \text{[Equation 10]}$$

In Equation 10, SD L1S1 means the effective radius (Semi-aperture) size of the object-side surface (first surface S1) of the first lens 110, SD L7S2 means the effective radius Semi-aperture) size of the image-side surface (fourteenth surface S14) of the seventh lens 170.

$$3 < (SD\ L1S1)/(SD\ L3S1) < 4.5 \quad \text{[Equation 11]}$$

In Equation 11, SD L1S1 means an effective radius (Semi-aperture) size of the object-side surface (first surface S1) of the first lens 110, and SD L3S1 means the effective radius (Semi-aperture) size of the object-side surface (fifth surface S5) of the third lens 130.

$$0.8 < (SD\ L6S2)/(SD\ L7S1) < 0.95 \quad \text{[Equation 12]}$$

In Equation 12, SD L6S2 means the effective radius (Semi-aperture) size of the image-side surface (twelfth surface S12) of the sixth lens 160, SD L7S1 means the effective radius (Semi-aperture) size of the object-side surface (thirteenth surface S13) of the seventh lens 170.

$$0.2 < |L1R1/L1R2| < 1 \quad \text{[Equation 13]}$$

In Equation 13, L1R1 means the radius of curvature of the object-side surface (first surface S1) of the first lens 110, and L1R2 means the radius of the curvature of the image-side surface (second surface S2) of the first lens 110.

$$10 < |L2R1/L3R2| < 300 \quad \text{[Equation 14]}$$

In Equation 14, L2R1 means the radius of curvature of the object-side surface (third surface S3) of the second lens 120, and L3R2 means the radius of curvature of the image-side surface (sixth surface S6) of the third lens 130.

$$5<|L3R1/L3R2|<9 \quad \text{[Equation 15]}$$

In Equation 15, L3R1 means the radius of curvature of the object-side surface (fifth surface S5) of the third lens 130, and L3R2 means the radius of curvature of the image-side surface (sixth surface S6) of the third lens 130.

$$0.1<|f1|/|f2|<1 \quad \text{[Equation 16]}$$

In Equation 16, f1 means a focal length of the first lens 110, and f2 means a focal length of the second lens 120.

$$1<|f4|/f3|<5 \quad \text{[Equation 17]}$$

In Equation 17, f3 means a focal length of the third lens 130, and f4 means a focal length of the fourth lens 140. In detail, [Equation 17] may be satisfied: 1.5<|f4|/|f3|<4. In more detail, [Equation 17] may be satisfied: 2<|f4|/|f3|<3.5.

$$0.5<|f6|/|f7|<2 \quad \text{[Equation 18]}$$

In Equation 18, f6 means a focal length of the sixth lens 160, and f7 means a focal length of the seventh lens 170. In detail, [Equation 18] may be satisfied: 0.5<|f6|/|f7|<1.5. In more detail, [Equation 18] may be satisfied: 0.7<|f6|/|f7|<1.2.

$$1<|f12|/|f34|<4 \quad \text{[Equation 19]}$$

In Equation 19, f12 means the focal length of the first lens group including the first and second lenses 110 and 120, and f34 means the focal length of the second lens group including the third and fourth lenses 130 and 140. That is, referring to [Equation 19], the focal length of the first lens group in the optical system 1000 may be greater than the focal length of the second lens group. In detail, [Equation 19] may be satisfied: 1<|f12|/|f34|<3.5. In more detail, [Equation 19] may be satisfied: 2<|f12|/|f34|<3.

$$0.1<F/|f12|<0.5 \quad \text{[Equation 20]}$$

In Equation 20, F means an effective focal length of the optical system 1000, and f12 means a focal length of the first lens group including the first and second lenses 110 and 120.

$$0.2<F/|f34|<1 \quad \text{[Equation 21]}$$

In Equation 21, F means an effective focal length of the optical system 1000, and f34 means a focal length of the second lens group including the third and fourth lenses 130 and 140.

$$0.5<F/f3456<1.5 \quad \text{[Equation 22]}$$

In Equation 22, F means an effective focal length of the optical system 1000, and f3456 means a focal length of a third lens group including the third to sixth lenses 130, 140, 150 and 160. In detail, [Equation 22] may be satisfied: 0.7<F/f3456<1.3, in consideration of the aberration characteristic of the optical system 1000. In more detail, [Equation 22] may be satisfied: 0.8<F/f3456<1.2.

$$95°<FOV<130° \quad \text{[Equation 23]}$$

In Equation 23, FOV means an angle of view of the optical system 1000.

$$1.4<nd1<1.6 \quad \text{[Equation 24]}$$

In Equation 24, nd1 means a refractive index of the first lens 110.

$$10<Vd4<30 \quad \text{[Equation 25]}$$

In Equation 25, Vd4 means an Abbe's Number of the fourth lens 140.

$$1.5<TTL/ImgH<3.5 \quad \text{[Equation 26]}$$

In Equation 26, TTL (Total track length) means a distance of the optical axis OA direction from the apex of the object-side surface (first surface S1) of the first lens 110 to the upper surface of the image sensor 300, ImgH means the vertical distance of the optical axis OA from the 0 field region, which is a center of the upper surface of the image sensor 300 overlapping the optical axis OA, to the 1.0 field region of the image sensor 300. That is, the denotes a value of ½ of the length in the diagonal direction of the effective region of the image sensor 300.

$$0.1<BFL/ImgH<0.8 \quad \text{[Equation 27]}$$

In Equation 27, BFL (back focal length) means the distance in direction of the optical axis OA from the apex of the image-side surface (the fourteenth surface S14) of the seventh lens 170 to the upper surface of the image sensor 300, ImgH means the vertical distance of the optical axis OA from the 0 field region, which is a center of the upper surface of the image sensor 300 overlapping the optical axis OA, to the 1.0 field region of the image sensor 300. That is, the ImgH denotes a value of ½ of the length in the diagonal direction of the effective region of the image sensor 300.

$$4<TTL/BFL<8 \quad \text{[Equation 28]}$$

In Equation 28, TTL (Total Track Length) means a distance in a direction of the optical axis (OA) from the apex of the object-side surface (first surface S1) of the first lens 110 to the upper surface of the image sensor 300, and BFL (Back focal length) means the distance in direction of the optical axis OA from the apex of the image-side surface (fourteenth surface S14) of the seventh lens 170 to the upper surface of the image sensor 300.

$$0.1<f/TTL<0.8 \quad \text{[Equation 29]}$$

In Equation 29, F means an effective focal length of the optical system 1000, and TTL means a distance in a direction of the optical axis (OA) from the apex of the object-side surface (first surface S1) of the first lens 110 to the upper surface of the image sensor 300.

$$1<F/BFL<3 \quad \text{[Equation 30]}$$

In Equation 30, F means an effective focal length of the optical system 1000, and BFL (Back focal length) means the distance in direction of the optical axis OA from the apex of the image-side surface (fourteenth surface S14) of the seventh lens 170 to the upper surface of the image sensor 300.

$$1<F/EPD<5 \quad \text{[Equation 31]}$$

In Equation 31, F means an effective focal length of the optical system 1000, and EPD means an entrance pupil diameter of the optical system 1000.

$$Z = \frac{cY^2}{1+\sqrt{1-(1+K)c^2Y^2}} + AY^4 + BY^6 + CY^8 + DY^{10} + EY^{12} + FY^{14} + \cdots \quad \text{[Equation 32]}$$

In Equation 32, Z is Sag, which may mean a distance in the optical axis direction from an arbitrary position on the aspherical surface to the apex of the aspherical surface.

In addition, Y may mean a distance in a direction perpendicular to the optical axis from an arbitrary position on the aspherical surface to the optical axis.

Also, c may mean a curvature of the lens, and K may mean a conic constant.

In addition, A, B, C, E, and may mean an aspheric constant.

The optical system 1000 according to the embodiment may be satisfied at least one of Equations 1 to 31. In this case, the optical system 1000 may have improved optical properties. In detail, when the optical system 1000 satisfies at least one of Equations 1 to 31, the resolution of the optical system 1000 may be improved, and distortion and aberration characteristics may be improved. In addition, the optical system 1000 may have a slimmer structure, thereby providing a slimmer and more compact device or apparatus including the optical system 1000.

The optical system 1000 according to the first embodiment will be described in more detail with reference to FIGS. 1 and 2. FIG. 1 is a configuration diagram of an optical system according to a first embodiment, and FIG. 2 is a graph illustrating aberration characteristics of the optical system according to the first embodiment.

Figure 2:
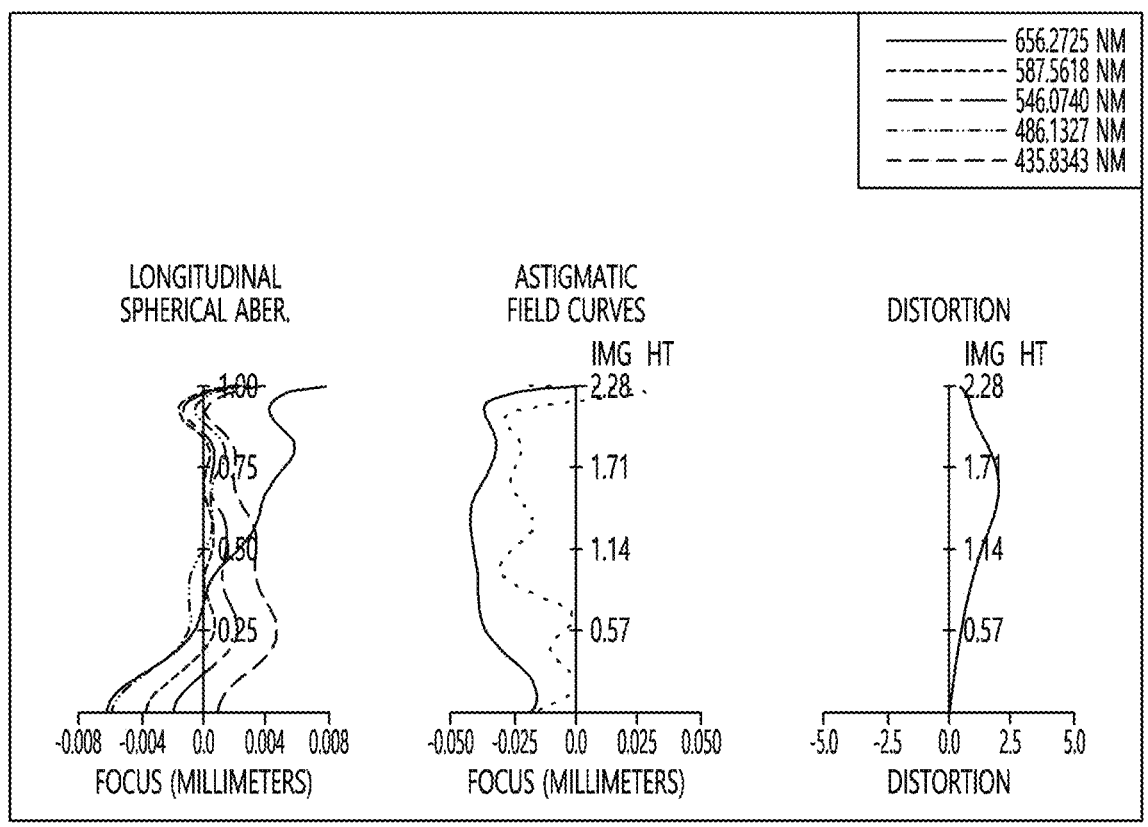
FIG. 2 is a graph illustrating aberration characteristics of the optical system according to FIG. 1.

Referring to FIGS. 1 and 2, the optical system 1000 according to the first embodiment may include a first lens 110, a second lens 120, a third lens 130, a fourth lens 140, a fifth lens 150, a sixth lens 160, a seventh lens 170, and an image sensor 300 which are sequentially arranged from the object side to the image side. The first to seventh lenses 110, 120, 130, 140, 150, 160, and 170 may be sequentially disposed along the optical axis OA of the optical system 1000.

Also, in the optical system 1000 according to the first embodiment, an aperture stop (not shown) may be disposed between the second lens 120 and the third lens 130. Also, a filter 500 may be disposed between the plurality of lenses 100 and the image sensor 300. In detail, the filter 500 may be disposed between the seventh lens 170 and the image sensor 300. Also, although not shown in the drawings, the optical system 1000 may further include the light path changing member (not shown). The light path changing member may be disposed in at least one of between the plurality of lenses 100 and the object, between the plurality of lenses 100, and between the plurality of lenses 100 and the image sensor 300.

Table 1 shows a radius of curvature of the first to seventh lenses 110, 120, 130, 140, 150, 160, and 170 according to the first embodiment, the thickness of each lens, the interval between lenses, respectively, the refractive index, the Abbe's Number, and the effective radius (Semi-aperture). Referring to FIGS. 1, 2 and Table 1, the first lens 110 of the optical system 1000 according to the first embodiment may have a negative refractive power. The first surface S1 of the first lens 110 may be concave, and the second surface S2 may be concave. The first lens 110 may have a concave shape on both sides. The first surface S1 may be an aspherical surface, and the second surface S2 may be an aspherical surface. The second lens 120 may have positive (+) refractive power. The third surface S3 of the second lens 120 may be convex, and the fourth surface S4 may be convex. The second lens 120 may have a shape in which both surfaces are convex. The third surface S3 may be an aspherical surface, and the fourth surface S4 may be an aspherical surface. The third lens 130 may have positive (+) refractive power. The fifth surface S5 of the third lens 130 may be convex, and the sixth surface S6 may be convex. The third lens 130 may have a shape in which both sides are convex. The fifth surface S5 may be an aspherical surface, and the sixth surface S6 may be an aspherical surface.

The fourth lens 140 may have negative (−) refractive power. The seventh surface S7 of the fourth lens 140 may be convex, and the eighth surface S8 may be concave. The fourth lens 140 may have a meniscus shape convex toward the object side. The seventh surface S7 may be an aspherical surface, and the eighth surface S8 may be an aspherical surface. The fifth lens 150 may have positive (+) refractive power. The ninth surface S9 of the fifth lens 150 may be convex, and the tenth surface S10 may be concave. The fifth lens 150 may have a meniscus shape convex toward the object side. The ninth surface S9 may be an aspherical surface, and the tenth surface S10 may be an aspherical surface. The sixth lens 160 may have positive (+) refractive power. The eleventh surface S11 of the sixth lens 160 may be concave, and the twelfth surface S12 may be convex. The sixth lens 160 may have a meniscus shape convex toward the image side. The eleventh surface S11 may be an aspherical surface, and the twelfth surface S12 may be an aspherical surface. The seventh lens 170 may have negative (−) refractive power. The thirteenth surface S13 of the seventh lens 170 may be convex, and the fourteenth surface S14 may be

TABLE 1

| Lens | Surface | Radius (mm) of curvature | Thickness(mm)/ Interval(mm) | Index | Abbe # | Effective radius (mm) |
|---|---|---|---|---|---|---|
| Lens 1 | S1 | −3.635 | 0.727 | 1.5334 | 56.5333 | 1.843 |
| | S2 | 6.965 | 0.455 | | | 0.989 |
| Lens 2 | S3 | 268.439 | 0.500 | 1.6199 | 25.5912 | 0.831 |
| | S4 | −9.417 | 0.154 | | | 0.587 |
| Stop | | infinity | −0.014 | | | 0.476 |
| Lens 3 | S5 | 6.904 | 0.620 | 1.5334 | 56.5333 | 0.479 |
| | S6 | −1.051 | 0.005 | | | 0.659 |
| Lens 4 | S7 | 3.361 | 0.220 | 1.658 | 21.4942 | 0.730 |
| | S8 | 1.443 | 0.195 | | | 0.839 |
| Lens 5 | S9 | 2.680 | 0.349 | 1.5334 | 56.5333 | 0.998 |
| | S10 | 3.759 | 0.232 | | | 1.056 |
| Lens 6 | S11 | −4.157 | 0.600 | 1.5334 | 56.5333 | 1.077 |
| | S12 | −0.926 | 0.085 | | | 1.168 |
| Lens 7 | S13 | 1.822 | 0.424 | 1.6199 | 25.5912 | 1.318 |
| | S14 | 0.701 | 0.321 | | | 1.900 |
| Filter | | infinity | 0.11 | | | 1.976 |
| | | infinity | 0.40 | | | 2.02 |
| Image sensor | | infinity | 0.00 | | | 2.28 | concave. The seventh lens 170 may have a meniscus shape convex toward the object side. The thirteenth surface S13 may be an aspherical surface, and the fourteenth surface S14 may be an aspherical surface.

In the optical system 1000 according to the first embodiment, the values of the aspheric coefficients of each lens surface are shown in Table 2 below.

TABLE 2

|   | S1 | S2 | S3 | S4 | S5 | S6 | S7 |
|---|---|---|---|---|---|---|---|
| K | 0 | 0 | −95 | 95 | 32.37714 | 0.887685 | −1 |
| A | 0.210 | 0.362 | 0.041 | 0.214 | 0.051 | −0.041 | −0.454 |
| B | −0.151 | 0.008 | −0.336 | −0.596 | 3.591 | 1.361 | 0.828 |
| C | 0.104 | −1.225 | 0.638 | 2.135 | −107.547 | −15.920 | −5.986 |
| D | −0.054 | 5.190 | −2.001 | 0.494 | 1583.593 | 130.288 | 36.156 |
| E | 0.019 | −11.555 | 4.913 | −76.991 | −14284.500 | −682.690 | −143.462 |
| F | −0.004 | 14.615 | −7.997 | 550.393 | 80329.970 | 2268.219 | 364.028 |
| G | 0.000 | −9.967 | 7.943 | −1812.210 | −274765.000 | −4603.880 | −564.348 |
| H | 0.000 | 2.826 | −3.360 | 2952.492 | 523206.600 | 5206.955 | 482.937 |
| J | 0.000 | 0.000 | 0.000 | −1849.540 | −425668.000 | −2516.610 | −174.720 |

|   | S8 | S9 | S10 | S11 | S12 | S13 | S14 |
|---|---|---|---|---|---|---|---|
| K | 0 | −32.522 | −87.0798 | 12.49423 | −0.71327 | −17.838 | −3.37027 |
| A | −0.40651 | 0.030945 | 0.061197 | 0.19039 | 0.305802 | −0.28419 | −0.38991 |
| B | 0.432657 | −0.20605 | −0.8163 | −0.74359 | −0.86612 | −0.59084 | 0.457546 |
| C | −0.71235 | 0.873275 | 2.652479 | 0.985227 | 2.806497 | 2.105896 | −0.35427 |
| D | 2.098237 | −1.92236 | −4.81665 | 1.150361 | −7.2774 | −3.04274 | 0.185673 |
| E | −5.61038 | 2.751962 | 5.00070S | −3.76167 | 14.68449 | 2.645906 | −0.06768 |
| F | 9.516745 | −2.59303 | −2.78816 | 1.707303 | −19.1401 | −1.56373 | 0.017165 |
| G | −8.95855 | 1.428254 | 0.641534 | 2.714791 | 14.63919 | 0.640668 | −0.00294 |
| H | 3.529667 | −0.33678 | 0 | −3.14317 | −5.9628 | −0.16216 | 0.000312 |
| J | 0 | 0 | 0 | 0.942451 | 0.999387 | 0.018297 | −1.59E−05 |

TABLE 3

|   | First embodiment |
|---|---|
| TTL | 5.3839 mm |
| F | 1.7404 mm |
| f1 | −4.3740 mm |
| f2 | 14.6859 mm |
| f3 | 1.7576 mm |
| f4 | −4.0271 mm |
| f5 | 15.7192 mm |
| f6 | 2.0989 mm |
| f7 | −2.1466 mm |
| BFL | 0.8307 mm |
| ImgH | 2.28 mm |
| EPD | 0.7252 mm |
| F-number | 2.4 |

TABLE 4

| Equation | | First embodiment |
|---|---|---|
| Equation 1 | $0.5 < f3/F < 2$ | 1.0099 |
| Equation 2 | $0.5 < L1\_CT/L2\_CT < 2.5$ | 1.4519 |
| Equation 3 | $0 < L2\_CT/L3\_CT < 1$ | 0.8065 |
| Equation 4 | $1 < L3\_CT/L4\_CT < 5$ | 2.8192 |
| Equation 5 | $1 < L6\_CT/L4\_CT < 5$ | 2.7262 |
| Equation 6 | $10 < d23/d34 < 100$ | 27.3888 |
| Equation 7 | $3.5 < L3\_CT/d23 < 5.5$ | 4.4419 |
| Equation 8 | $30 < L3\_CT/d34 < 550$ | 121.6591 |
| Equation 9 | $10 < L4\_CT/d34 < 200$ | 43.1540 |
| Equation 10 | $0.8 < (SD\ L1S1)/(SD\ L7S2) < 1$ | 0.9700 |
| Equation 11 | $3 < (SD\ L1S1)/(SD\ L3S1) < 4.5$ | 3.8451 |
| Equation 12 | $0.8 < (SD\ L6S2)/(SD\ L7S1) < 0.95$ | 0.8858 |
| Equation 13 | $0.2 < |L1R1/L1R2| < 1$ | 0.5219 |
| Equation 14 | $10 < |L2R1/L3R2| < 300$ | 255.4464 |
| Equation 15 | $5 < |L3R1/L3R2| < 9$ | 6.5703 |
| Equation 16 | $0.1 < |f1|/|f2| < 1$ | 0.2978 |
| Equation 17 | $1 < |f4|/|f3| < 5$ | 2.2912 |
| Equation 18 | $0.5 < |f6|/|f7| < 2$ | 0.9778 |

TABLE 4-continued

| Equation | | First embodiment |
|---|---|---|
| Equation 19 | $1 < |f12|/|f34| < 4$ | 2.5239 |
| Equation 20 | $0.1 < F/|f12| < 0.5$ | 0.250724 |
| Equation 21 | $0.2 < F/|f34| < 1$ | 0.632791 |

TABLE 4-continued

| Equation | | First embodiment |
|---|---|---|
| Equation 22 | $0.5 < F/f3456 < 1.5$ | 0.9833 |
| Equation 23 | FOV | 105.0000 |
| Equation 24 | $1.4 < nd1 < 1.6$ | 1.5334 |
| Equation 25 | $10 < Vd4 < 30$ | 21.4942 |
| Equation 26 | $1.5 < TTL/ImgH < 3.5$ | 2.36136 |
| Equation 27 | $0.1 < BFL/ImgH < 0.8$ | 0.3643 |
| Equation 28 | $4 < TTL/BFL < 8$ | 6.48116 |
| Equation 29 | $0.1 < F/TTL < 0.8$ | 0.323265 |
| Equation 30 | $1 < F/BFL < 3$ | 2.095135 |
| Equation 31 | $1 < F/EPD < 5$ | 2.4 |

Table 3 relates to the items of the above-described equations in the optical system 1000 according to the first embodiment, and relates TTL (total track length), BFL (back focal length), F value, ImgH, and Focal lengths f1, f2, f3, f4, f5, f6, and f7 of each of the first to seventh lenses 110, 120, 130, 140, 150, 160, and 170, and the entrance pupil diameter (EPD), etc. In addition, Table 4 shows the result values of Equations 1 to 27 described above in the optical system 1000 according to the first embodiment. Referring to Table 4, it may be seen that the optical system 1000 according to the first embodiment satisfies at least one of Equations 1 to 31. In detail, it may be seen that the optical system 1000 according to the first embodiment satisfies all of Equations 1 to 31 above.

Accordingly, the optical system 1000 according to the first embodiment may be provided with a slimmer structure. In addition, the optical system 1000 may have improved optical characteristics and aberration characteristics as shown in FIG. 2. In detail, FIG. 2 is a graph of the aberration characteristics of the optical system 1000 according to the first embodiment, and this is graph measuring longitudinal spherical aberration, astigmatic field curves, and distortion aberration from left to right. In FIG. 2, the X-axis may indicate a focal length (mm) and distortion aberration (%), and the Y-axis may indicate the height of an image. In addition, the graph for spherical aberration is a graph for light in a wavelength band of about 470 nm, about 510 nm, about 555 nm, about 610 nm, and about 650 nm, and the graph for astigmatism and distortion aberration is a graph for light in a wavelength band of 555 nm. That is, referring to FIG. 2, the plurality of lenses 100 in the optical system 1000 according to the first embodiment may have improved resolution as they have a set shape, center thickness, center interval, focal length, etc., and a distortion may be reduced. In addition, the optical system 1000 may reduce aberration and may have improved optical properties.

Figure 3:
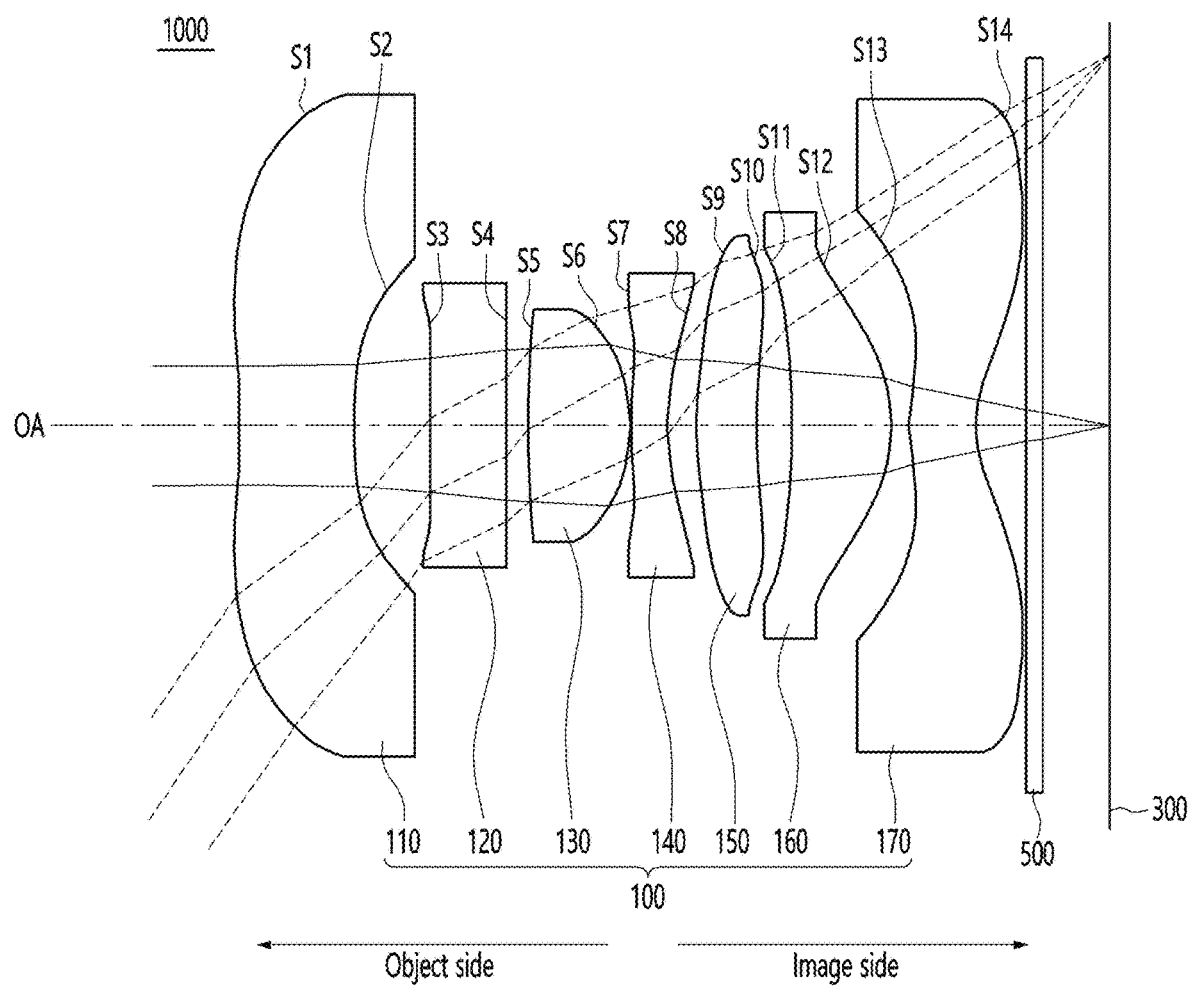
FIG. 3 is a block diagram of an optical system according to a second embodiment.

The optical system 1000 according to the second embodiment will be described in more detail with reference to FIGS. 3 and 4. FIG. 3 is a configuration diagram of an optical system according to a second embodiment, and FIG. 4 is a graph illustrating aberration characteristics of the optical system according to the second embodiment.

Figure 4:
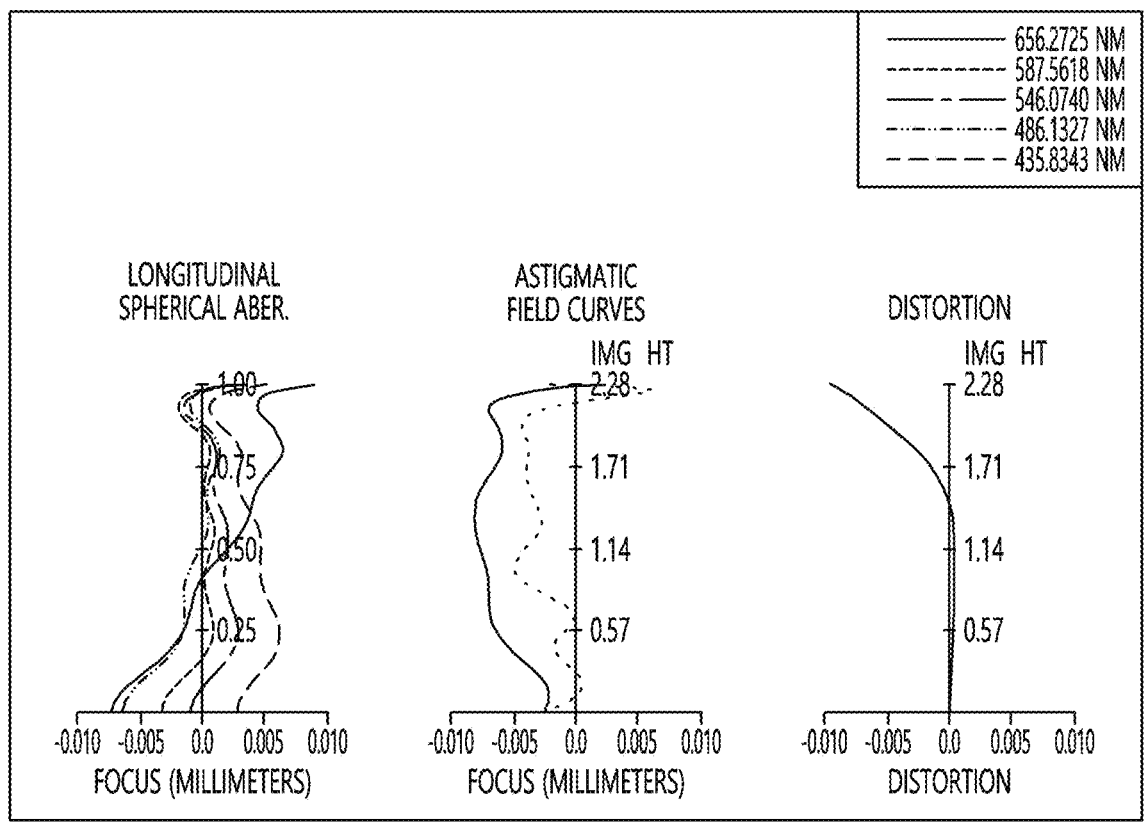
FIG. 4 is a graph illustrating aberration characteristics of the optical system according to FIG. 3.

Deterring to FIGS. 3 and 4, the optical system 1000 according to the second embodiment may include a first lens 110, a second lens 120, a third lens 130, a fourth lens 140, a fifth lens 150, a sixth lens 160, a seventh lens 170, and an image sensor 300 sequentially arranged from the object side to the image side. The first to seventh lenses 110, 120, 130, 140, 150, 160, and 170 may be sequentially disposed along the optical axis OA of the optical system 1000.

Figure 5:
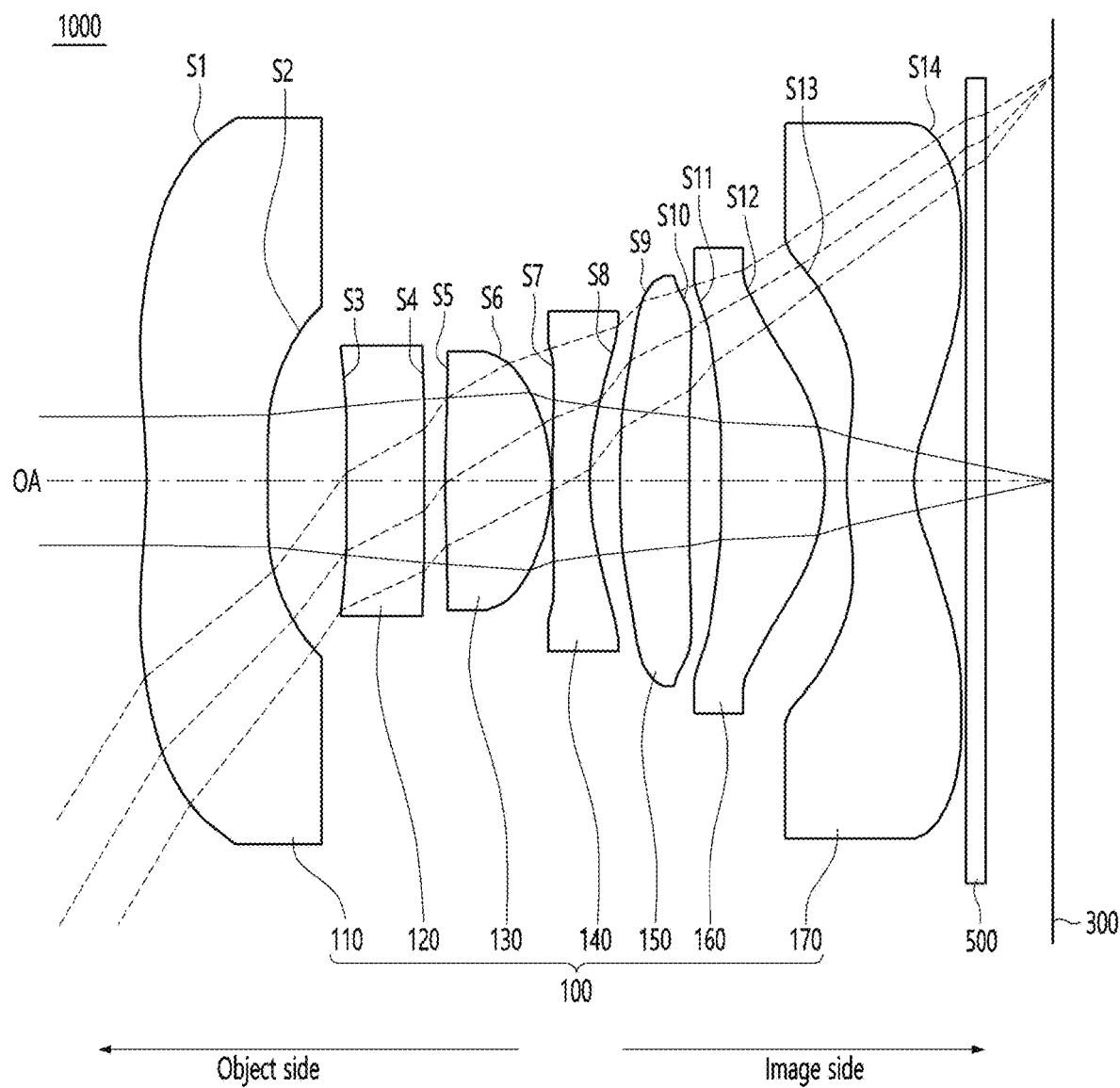
FIG. 5 is a block diagram of an optical system according to a third embodiment.

Also, in the optical system 1000 according to the second embodiment, an aperture stop (not shown) may be disposed between the second lens 120 and the third lens 130. Also, a filter 500 may be disposed between the plurality of lenses 100 and the image sensor 300. In detail, the filter 500 may be disposed between the seventh lens 170 and the image sensor 300. Also, although not shown in the drawings, the optical system 1000 may further include the light path changing member (not shown). The light path changing member may be disposed in at least one of between the plurality of lenses 100 and the object, between the plurality of lenses 100, and between the plurality of lenses 100 and the image sensor 300.

aperture). Referring to FIGS. 3, 4 and 5, the first lens 110 of the optical system 1000 according to the second embodiment may have a negative refractive power. The first surface S1 of the first lens 110 may be concave, and the second surface S2 may be concave. The first lens 110 may have a concave shape on both sides. The first surface S1 may be an aspherical surface, and the second surface S2 may be an aspherical surface. The second lens 120 may have positive (+) refractive power. The third surface S3 of the second lens 120 may be concave, and the fourth surface S4 may be convex. The second lens 120 may have a meniscus shape convex toward the image side. The third surface S3 may be an aspherical surface, and the fourth surface S4 may be an aspherical surface. The third lens 130 may have positive (+) refractive power. The fifth surface S5 of the third lens 130 may be convex, and the sixth surface S6 may be convex. The third lens 130 may have a shape in which both sides are convex. The fifth surface S5 may be an aspherical surface, and the sixth surface S6 may be an aspherical surface. The fourth lens 140 may have negative (−) refractive power. The seventh surface S7 of the fourth lens 140 may be convex, and the eighth surface S8 may be concave. The fourth lens 140 may have a meniscus shape convex toward the object side. The seventh surface S7 may be an aspherical surface, and the eighth surface S8 may be an aspherical surface.

The fifth lens 150 may have positive (+) refractive power. The ninth surface S9 of the fifth lens 150 may be convex, and the tenth surface S10 may be concave. The fifth lens 150 may have a meniscus shape convex toward the object side. The ninth surface S9 may be an aspherical surface, and the tenth surface S10 may be an aspherical surface. The sixth lens 160 may have positive (+) refractive power. The eleventh surface S11 of the sixth lens 160 may be concave, and the twelfth surface S12 may be convex. The sixth lens 160 may have a meniscus shape convex toward the image side. The eleventh surface S11 may be an aspherical surface, and the twelfth surface S12 may be an aspherical surface. The seventh lens 170 may have negative (−) refractive power. The thirteenth surface S13 of the seventh lens 170 may be

TABLE 5

| Lens | Surface | Radius (mm) of curvature | Thickness(mm)/ Interval(mm) | Index | Abbe # | Effective radius (mm) |
|---|---|---|---|---|---|---|
| Lens 1 | S1 | −3.630 | 0.712 | 1.5334 | 56.5333 | 1.848 |
|  | S2 | 6.600 | 0.457 |  |  | 0.971 |
| Lens 2 | S3 | −33.745 | 0.466 | 1.6199 | 25.5912 | 0.807 |
|  | S4 | −7.202 | 0.147 |  |  | 0.586 |
| Stop |  | infinity | −0.014 |  |  | 0.473 |
| Lens 3 | S5 | 6.904 | 0.619 | 1.5334 | 56.533 | 30.476 |
|  | S6 | −1.051 | 0.008 |  |  | 0.660 |
| Lens 4 | S7 | 3.249 | 0.221 | 1.658 | 21.4942 | 0.737 |
|  | S8 | 1.415 | 0.178 |  |  | 0.854 |
| Lens 5 | S9 | 2.706 | 0.377 | 1.5334 | 56.5333 | 1.009 |
|  | S10 | 3.876 | 0.212 |  |  | 1.069 |
| Lens 6 | S11 | −4.130 | 0.600 | 1.5334 | 56.5333 | 1.087 |
|  | S12 | −0.919 | 0.111 |  |  | 1.180 |
| Lens 7 | S13 | 1.802 | 0.406 | 1.6199 | 25.5912 | 1.329 |
|  | S14 | 0.693 | 0.306 |  |  | 1.914 |
| Filter |  | infinity | 0.11 |  |  | 2.006 |
|  |  | infinity | 0.40 |  |  | 2.04 |
| Image sensor |  | infinity | 0.00 |  |  | 2.28 |

Table 5 shows the radius of curvature of the first to seventh lenses 110, 120, 130, 140, 150, 160, and 170 according to the second embodiment, the thickness of each lens, the interval between lenses, respectively, the refractive index, the Abbe's Number, and the effective radius (Semiconvex, and the fourteenth surface S14 may be concave. The seventh lens 170 may have a meniscus shape convex toward the object side. The thirteenth surface S13 may be an aspherical surface, and the fourteenth surface S14 may be an aspherical surface.

In the optical system 1000 according to the second embodiment, the values of the aspheric coefficients of each lens surface are shown in Table 6 below.

TABLE 6

|   | S1 | S2 | S3 | S4 | S5 | S6 | S7 |
|---|---|---|---|---|---|---|---|
| K | 0 | 0 | 65.16015 | −58.6235 | −58.6235 | 0.886794 | 5.700813 |
| A | 0.205939 | 0.35401 | 0.029435 | 0.17614 | 0.17614 | −0.0618 | −0.48205 |
| B | −0.14861 | 0.006386 | −0.32984 | −0.66084 | −0.66084 | 1.820751 | 1.046099 |
| C | 0.103931 | −1.14622 | 0.765481 | 3.776584 | 3.776584 | −20.7142 | −8.23961 |
| D | −0.05544 | 5.055582 | −2.53315 | −20.6331 | −20.6331 | 161.987 | 48.56571 |
| E | 0.02041 | −11.5732 | 6.178757 | 86.6298 | 86.6298 | −819.39 | −188.275 |
| F | −0.00474 | 15.0778 | −9.94482 | −227.843 | −227.843 | 2648.469 | 471.2479 |
| G | 0.000613 | −10.5706 | 9.725585 | 376.7673 | 376.7673 | −5256.8 | −725.45 |
| H | −3.29E−05 | 3.057163 | −4.08894 | −374.979 | −374.979 | 5832.251 | 619.0083 |
| J | 0 | 0 | 0 | 241.6408 | 241.6408 | −2771.74 | −223.705 |

|   | S8 | S9 | S10 | S11 | S12 | S13 | S14 |
|---|---|---|---|---|---|---|---|
| K | 0 | −30.7608 | −94.3911 | 12.56731 | −0.71265 | −20.3108 | −3.48272 |
| A | −0.39289 | 0.020568 | 0.055869 | 0.185293 | 0.258043 | −0.31822 | −0.39673 |
| B | 0.398152 | −0.11764 | −0.80925 | −0.75326 | −0.5558 | −0.51807 | 0.475363 |
| C | −0.65763 | 0.562823 | 2.584773 | 1.244811 | 1.675978 | 2.049871 | −0.38044 |
| D | 1.657781 | −1.198 | −4.69372 | 0.306895 | −4.32551 | −3.19701 | 0.20613 |
| E | −3.87231 | 1.536264 | 4.913079 | −2.79395 | 9.365975 | 3.04224 | −0.07712 |
| F | 6.423388 | −1.23494 | −2.77663 | 1.685076 | −13.0145 | −1.98417 | 0.019771 |
| G | −6.3276 | 0.550503 | 0.649027 | 1.871973 | 10.40064 | 0.887783 | −0.00335 |
| H | 2.639403 | −0.09422 | 0 | −2.49478 | −4.3621 | −0.24042 | 0.000345 |
| J | 0 | 0 | 0 | 0.789429 | 0.745582 | 0.028687 | −1.69E−05 |

TABLE 7

|   | Second embodiment |
|---|---|
| TTL | 5.3170 mm |
| F | 1.7269 mm |
| f1 | −4.2868 mm |
| f2 | 14.6713 mm |
| f3 | 1.7569 mm |
| f4 | −4.0016 mm |
| f5 | 15.1173 mm |
| f6 | 2.0814 mm |
| f7 | −2.1119 mm |
| BFL | 0.8161 mm |
| ImgH | 2.28 mm |
| EPD | 0.7196 mm |
| F-number | 2.4 |

TABLE 8

|   | Equation | Second embodiment |
|---|---|---|
| Equation 1 | 0.5 < f3/F < 2 | 1.0173 |
| Equation 2 | 0.5 < L1_CT/L2_CT < 2.5 | 1.5262 |
| Equation 3 | 0 < L2_CT/L3_CT < 1 | 0.7537 |
| Equation 4 | 1 < L3_CT/L4_CT < 5 | 2.7931 |
| Equation 5 | 1 < L6_CT/L4_CT < 5 | 2.7095 |
| Equation 6 | 10 < d23/d34 < 100 | 17.2418 |
| Equation 7 | 3.5 < L3_CT/d23 < 5.5 | 4.6589 |
| Equation 8 | 30 < L3_CT/d34 < 550 | 80.3276 |
| Equation 9 | 10 < L4_CT/d34 < 200 | 28.7590 |
| Equation 10 | 0.8 < (SD L1S1)/(SD L7S2) < 1 | 0.9655 |
| Equation 11 | 3 < (SD L1S1)/(SD L3S1) < 4.5 | 3.8785 |
| Equation 12 | 0.8 < (SD L6S2)/(SD L7S1) < 0.95 | 0.8874 |
| Equation 13 | 0.2 < |L1R1/L1R2| < 1 | 0.5500 |
| Equation 14 | 10 < |L2R1/L3R2| < 300 | 32.1220 |
| Equation 15 | 5 < |L3R1/L3R2| < 9 | 6.5725 |
| Equation 16 | 0.1 < |f1|/|f2| < 1 | 0.2922 |
| Equation 17 | 1 < f4/f3 < 5 | 2.2776 |
| Equation 18 | 0.5 < |f6|/|f7| < 2 | 0.9856 |
| Equation 19 | 1 < |f12|/|f34| < 4 | 2.4660 |
| Equation 20 | 0.1 < F/|f12| < 0.5 | 0.254577 |
| Equation 21 | 0.2 < F/|f34| < 1 | 0.627776 |
| Equation 22 | 0.5 < F/f3456 < 1.5 | 0.9868 |
| Equation 23 | FOV | 110.0000 |
| Equation 24 | 1.4 < nd1 < 1.6 | 1.5334 |
| Equation 25 | 10 < Vd4 < 30 | 21.4942 |
| Equation 26 | 1.5 < TTL/ImgH < 3.5 | 2.332018 |
| Equation 27 | 0.1 < BFL/ImgH < 0.8 | 0.3579 |
| Equation 28 | 4 < TTL/BFL < 8 | 6.515133 |
| Equation 29 | 0.1 < F/TTL < 0.8 | 0.324797 |
| Equation 30 | 1 < F/BFL < 3 | 2.116098 |
| Equation 31 | 1 < F/EPD < 5 | 2.4 |

Table 7 relates to the items of the above-described equations in the optical system 1000 according to the second embodiment, and relates TTL (total track length), BFL (back focal length), F value, ImgH, and Focal lengths f1, f2, f3, f4, f5, f6, and f7 of each of the first to seventh lenses 110, 120, 130, 140, 150, 160, and 170, and the entrance pupil diameter (EPD), etc. In addition, Table 8 shows the result values of Equations 1 to 31 described above in the optical system 1000 according to the second embodiment. Referring to Table 8, it may be seen that the optical system 1000 according to the second embodiment satisfies at least one of Equations 1 to 31. In detail, it may be seen that the optical system 1000 according to the second embodiment satisfies all of Equations 1 to 31 above.

Accordingly, the optical system 1000 according to the second embodiment may be provided with a slimmer structure. In addition, the optical system 1000 may have improved optical characteristics and aberration characteristics as shown in FIG. 4. In detail, FIG. 4 is a graph of the aberration characteristics of the optical system 1000 according to the second embodiment, and this is graph measuring longitudinal spherical aberration, astigmatic field curves, and distortion aberration from left to right. In FIG. 4, the X-axis may indicate a focal length (mm) and distortion aberration (%), and the Y-axis may indicate the height of an image. In addition, the graph for spherical aberration is a graph for light in a wavelength band of about 470 nm, about 510 nm, about 555 nm, about 610 nm, and about 650 nm, and the graph for astigmatism and distortion aberration is a graph for light in a wavelength band of 555 nm. That is, referring to FIG. 4, the plurality of lenses 100 in the optical system 1000 according to the second embodiment may have improved resolution as they have a set shape, center thickness, center interval, focal length, etc., and distortion may be reduced. In addition, the optical system 1000 may reduce aberration and may have improved optical properties.

The optical system 1000 according to the third embodiment will be described in more detail with reference to FIGS. 5 and 6. FIG. 5 is a configuration diagram of an optical system according to the third embodiment, and FIG. 6 is a graph illustrating aberration characteristics of the optical system according to the third embodiment.

Figure 6:
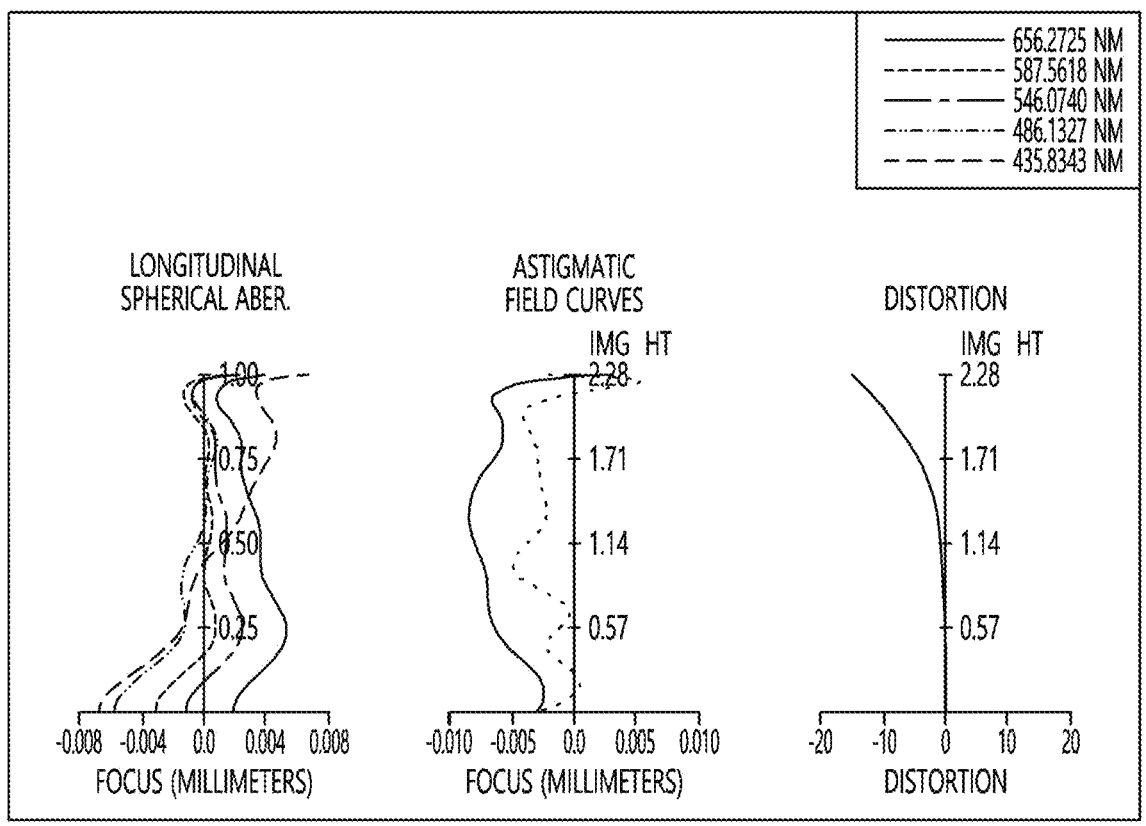
FIG. 6 is a graph illustrating aberration characteristics of the optical system according to FIG. 5.

Referring to FIGS. 5 and 6, the optical system 1000 according to the third embodiment may include a first lens 110, a second lens 120, a third lens 130, a fourth lens 140, a fifth lens 150, a sixth lens 160, a seventh lens 170, and an image sensor 300 sequentially arranged from the object side to the image side. The first to seventh lenses 110, 120, 130, 140, 150, 160, and 170 may be sequentially disposed along the optical axis OA of the optical system 1000.

In the optical system 1000 according to the third embodiment, an aperture stop (not shown) may be disposed between the second lens 120 and the third lens 130. Also, a filter 500 may be disposed between the plurality of lenses 100 and the image sensor 300. In detail, the filter 500 may be disposed between the seventh lens 170 and the image sensor 300. Although not shown in the drawings, the optical system 1000 may further include the light path changing member (not shown). The light path changing member may be disposed in at least one of between the plurality of lenses 100 and the object, between the plurality of lenses 100, and between the plurality of lenses 100 and the image sensor 300.

second surface S2 may be concave. The first lens 110 may have a concave shape on both sides. The first surface S1 may be an aspherical surface, and the second surface S2 may be an aspherical surface. The second lens 120 may have positive (+) refractive power. The third surface S3 of the second lens 120 may be concave, and the fourth surface S4 may be convex. The second lens 120 may have a meniscus shape convex toward the image side. The third surface S3 may be an aspherical surface, and the fourth surface S4 may be an aspherical surface. The third lens 130 may have positive (+) refractive power. The fifth surface S5 of the third lens 130 may be convex, and the sixth surface S6 may be convex. The third lens 130 may have a shape in which both sides are convex. The fifth surface S5 may be an aspherical surface, and the sixth surface S6 may be an aspherical surface.

The fourth lens 140 may have negative (−) refractive power. The seventh surface S7 of the fourth lens 140 may be convex, and the eighth surface S8 may be concave. The fourth lens 140 may have a meniscus shape convex toward the object side. The seventh surface S7 may be an aspherical surface, and the eighth surface S8 may be an aspherical surface. The fifth lens 150 may have positive (+) refractive power. The ninth surface S9 of the fifth lens 150 may be convex, and the tenth surface S10 may be concave. The fifth lens 150 may have a meniscus shape convex toward the object side. The ninth surface S9 may be an aspherical surface, and the tenth surface S10 may be an aspherical surface. The sixth lens 160 may have positive (+) refractive power. The eleventh surface S11 of the sixth lens 160 may be concave, and the twelfth surface S12 may be convex. The sixth lens 160 may have a meniscus shape convex toward the image side. The eleventh surface S11 may be an aspherical surface, and the twelfth surface S12 may be an aspherical surface. The seventh lens 170 may have negative (−) refrac-

TABLE 9

| Lens | Surface | Radius (mm) of curvature | Thickness(mm)/ Interval(mm) | Index | Abbe # | Effective radius (mm) |
|---|---|---|---|---|---|---|
| Lens 1 | S1 | −3.569 | 0.701 | 1.5334 | 56.5333 | 1.848 |
|  | S2 | 6.620 | 0.462 |  |  | 0.933 |
| Lens 2 | S3 | −14.913 | 0.451 | 1.6199 | 25.5912 | 0.719 |
|  | S4 | −5.642 | 0.139 |  |  | 0.511 |
| Stop |  | infinity | −0.014 |  |  | 0.472 |
| Lens 3 | S5 | 6.904 | 0.616 | 1.5334 | 56.5333 | 0.474 |
|  | S6 | −1.050 | 0.002 |  |  | 0.661 |
| Lens 4 | S7 | 3.192 | 0.222 | 1.658 | 21.4942 | 0.740 |
|  | S8 | 1.401 | 0.171 |  |  | 0.862 |
| Lens 5 | S9 | 2.712 | 0.400 | 1.5334 | 56.5333 | 1.014 |
|  | S10 | 3.934 | 0.200 |  |  | 1.078 |
| Lens 6 | S11 | −4.134 | 0.600 | 1.5334 | 56.5333 | 1.095 |
|  | S12 | −0.916 | 0.130 |  |  | 1.189 |
| Lens 7 | S13 | 1.781 | 0.389 | 1.6199 | 25.5912 | 1.335 |
|  | S14 | 0.683 | 0.295 |  |  | 1.917 |
| Filter |  | infinity | 0.110 |  |  | 2.018 |
|  |  | infinity | 0.397 |  |  | 2.06 |
| Image sensor |  | infinity | 0.003 |  |  | 2.28 |

Table 9 shows the radius of curvature of the first to seventh lenses 110, 120, 130, 140, 150, 160, and 170 according to the third embodiment, the thickness of each lens, the interval between lenses, respectively, the refractive index, the Abbe's Number, and the effective radius (Semi-aperture). Referring to FIGS. 5, 6, and Table 9, the first lens 110 of the optical system 1000 according to the third embodiment may have a negative refractive power. The first surface S1 of the first lens 110 may be concave, and the tive power. The thirteenth surface S13 of the seventh lens 170 may be convex, and the fourteenth surface S14 may be concave. The seventh lens 170 may have a meniscus shape convex toward the object side. The thirteenth surface S13 may be an aspherical surface, and the fourteenth surface S14 may be an aspherical surface.

In the optical system 1000 according to the third embodiment, the values of the aspheric coefficients of each lens surface are shown in Table 10 below.

TABLE 10

| | S1 | S2 | S3 | S4 | S5 | S6 | S7 |
|---|---|---|---|---|---|---|---|
| K | 0 | 0 | 88.17435 | 80.24043 | 26.2211 | 0.884957 | −93.4728 |
| A | 0.201764 | 0.344568 | 0.018722 | 0.2465 | 0.058977 | −0.05768 | −0.09415 |
| B | −0.14449 | 0.012452 | −0.31325 | −0.82947 | 3.117481 | 1.571364 | −0.68474 |
| C | 0.100714 | −1.09042 | 0.824066 | 8.956992 | −98.0276 | −16.7092 | 1.203981 |
| D | −0.05395 | 4.84509 | −2.86279 | −83.1602 | 1484.873 | 129.3227 | 5.210585 |
| E | 0.020062 | −11.0888 | 7.227888 | 557.7787 | −13817.6 | −657.182 | −43.8169 |
| F | −0.00474 | 14.44402 | −12.0071 | −2405.6 | 80399.33 | 2139.874 | 145.9596 |
| G | 0.000635 | −10.0767 | 11.97115 | 6465.303 | −285320 | −4274.09 | −259.79 |
| H | −3.61E−05 | 2.871513 | −5.12203 | −9833.64 | 565013.2 | 4765.808 | 238.0675 |
| J | 0 | 0 | 0 | 6581.359 | −478984 | −2276.15 | −88.5406 |

| | S8 | S9 | S10 | S11 | S12 | S13 | S14 |
|---|---|---|---|---|---|---|---|
| K | 0 | −29.7565 | −93.4837 | 12.56768 | −0.71232 | −23.7388 | −3.59613 |
| A | −0.37801 | 0.016958 | 0.037375 | 0.172402 | 0.217742 | −0.33443 | −0.39886 |
| B | 0.288657 | −0.07362 | −0.70821 | −0.70014 | −0.25165 | −0.50322 | 0.481178 |
| C | −0.0717 | 0.394133 | 2.257195 | 1.311002 | 0.433353 | 2.056186 | −0.39022 |
| D | −0.59367 | −0.82106 | −4.18235 | −0.17691 | −0.89021 | −3.29479 | 0.213262 |
| E | 1.543654 | 0.954887 | 4.492446 | −2.43649 | 3.030066 | 3.205813 | −0.07959 |
| F | −1.3829 | −0.63057 | −2.60793 | 2.643539 | −5.63253 | −2.1187 | 0.020012 |
| G | −0.12528 | 0.17644 | 0.624501 | −0.04911 | 5.256957 | 0.95541 | −0.00326 |
| H | 0.546043 | 0.006362 | 0 | −1.2065 | −2.41292 | −0.26091 | 0.000317 |
| J | 0 | 0 | 0 | 0.482935 | 0.436787 | 0.031508 | −1.46E−05 |

TABLE 11

| | Third embodiment |
|---|---|
| TTL | 5.2722 mm |
| F | 1.7135 mm |
| f1 | −4.2456 mm |
| f2 | 14.3728 mm |
| f3 | 1.7555 mm |
| f4 | −3.9885 mm |
| f5 | 14.6989 mm |
| f6 | 2.0705 mm |
| f7 | −2.0693 mm |
| BFL | 0.8052 mm |
| ImgH | 2.28 mm |
| EPD | 0.7140 mm |
| F-number | 2.4 |

TABLE 12

| | Equation | Third embodiment |
|---|---|---|
| Equation 1 | 0.5 < f3/F < 2 | 1.0245 |
| Equation 2 | 0.5 < L1_CT/L2_CT < 2.5 | 1.5568 |
| Equation 3 | 0 < L2_CT/L3_CT < 1 | 0.7312 |
| Equation 4 | 1 < L3_CT/L4_CT < 5 | 2.7811 |
| Equation 5 | 1 < L6_CT/L4_CT < 5 | 2.7079 |
| Equation 6 | 10 < d23/d34 < 100 | 83.2361 |
| Equation 7 | 3.5 < L3_CT/d23 < 5.5 | 4.9354 |
| Equation 8 | 30 < L3_CT/d34 < 550 | 410.8042 |
| Equation 9 | 10 < L4_CT/d34 < 200 | 147.7144 |
| Equation 10 | 0.8 < (SD L1S1)/(SD L7S2) < 1 | 0.9636 |
| Equation 11 | 3 < (SD L1S1)/(SD L3S1) < 4.5 | 3.8947 |
| Equation 12 | 0.8 < (SD L6S2)/(SD L7S1) < 0.95 | 0.8908 |
| Equation 13 | 0.2 < |L1R1/L1R2| < 1 | 0.5391 |
| Equation 14 | 10 < |L2R1/L3R2| < 300 | 14.2075 |
| Equation 15 | 5 < |L3R1/L3R2| < 9 | 6.5776 |
| Equation 16 | 0.1 < |f1|/|f2| < 1 | 0.2954 |
| Equation 17 | 1 < |f4|/|f3| < 5 | 2.2720 |
| Equation 18 | 0.5 < |f6|/f7| < 2 | 1.0006 |
| Equation 19 | 1 < |f12|/|f34| < 4 | 2.4765 |
| Equation 20 | 0.1 < F/|f12| < 0.5 | 0.250929 |
| Equation 21 | 0.2 < F/|f34| < 1 | 0.621416 |
| Equation 22 | 0.5 < F/f3456 < 1.5 | 0.9791 |
| Equation 23 | FOV | 114.9998 |
| Equation 24 | 1.4 < nd1 < 1.6 | 1.5334 |
| Equation 25 | 10 < Vd4 < 30 | 21.4942 |
| Equation 26 | 1.5 < TTL/ImgH < 3.5 | 2.312368 |
| Equation 27 | 0.1 < BFL/ImgH < 0.8 | 0.3532 |
| Equation 28 | 4 < TTL/BFL < 8 | 6.54769 |
| Equation 29 | 0.1 < F/TTL < 0.8 | 0.325005 |
| Equation 30 | 1 < F/BFL < 3 | 2.128035 |
| Equation 31 | 1 < F/EPD < 5 | 2.4 |

Table 11 relates for the items of the above-described equations in the optical system 1000 according to the third embodiment, and relates TTL (total track length), BFL (back focal length), F value, ImgH, and Focal lengths f1, f2, f3, f4, f5, f6, and f7 of each of the first to seventh lenses 110, 120, 130, 140, 150, 160, and 170, and the entrance pupil diameter (EPD), etc. In addition, Table 12 shows the result values of Equations 1 to 31 described above in the optical system 1000 according to the third embodiment. Referring to Table 12, it may be seen that the optical system 1000 according to the third embodiment satisfies at least one of Equations 1 to 31. In detail, it may be seen that the optical system 1000 according to the third embodiment satisfies all of Equations 1 to 31 above.

Accordingly, the optical system 1000 according to the third embodiment may be provided with a slimmer structure. In addition, the optical system 1000 may have improved optical characteristics and aberration characteristics as shown in FIG. 6. In detail, FIG. 6 is a graph of the aberration characteristics of the optical system 1000 according to the third embodiment, this is graph measuring longitudinal spherical aberration, astigmatic field curves, and distortion aberration from left to right. In FIG. 6, the X-axis may indicate a focal length (mm) and distortion aberration (%), and the Y-axis may indicate the height of an image. In addition, the graph for spherical aberration is a graph for light in a wavelength band of about 470 nm, about 510 nm, about 555 nm, about 610 nm, and about 650 nm, and the graph for astigmatism and distortion aberration is a graph for light in a wavelength band of 555 nm. That is, referring to FIG. 6, the plurality of lenses 100 in the optical system 1000 according to the third embodiment may have improved resolution as they have a set shape, center thickness, center interval, focal length, etc., and distortion can be reduced. In addition, the optical system 1000 may reduce aberration and may have improved optical properties.

The optical system 1000 according to the embodiment may be satisfied at least one of the above-described equations. Accordingly, the optical system 1000 may reduce aberration by blocking unnecessary light rays entering the optical system 1000, and may have improved resolution and distortion characteristics. Accordingly, the optical system 1000 according to the embodiment may have improved optical characteristics and may have a slimmer structure.

Figure 7:
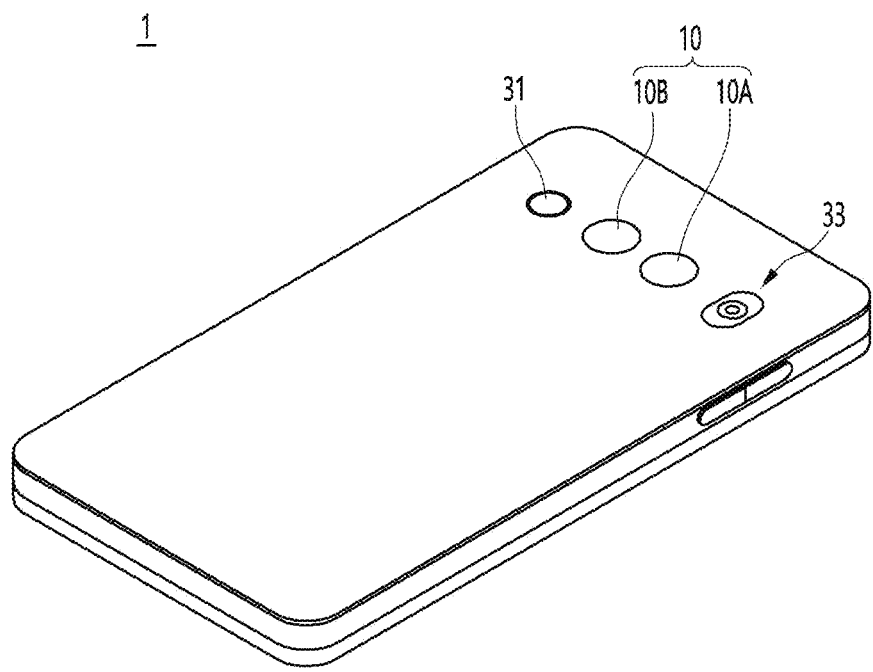
FIG. 7 is a diagram illustrating that the camera module according to the embodiment is applied to a mobile terminal.

FIG. 7 is a diagram illustrating that the camera module according to the embodiment is applied to a mobile terminal.

Referring to FIG. 7, the mobile terminal 1 may include a camera module 10 provided on the rear side. The camera module 10 may include an image capturing function. Also, the camera module 10 may include at least one of an auto focus function, a zoom function, and an OIS function. The camera module 10 may process a still video image or an image frame of a moving image obtained by the image sensor 300 in a shooting mode or a video call mode. The processed image frame may be displayed on a display unit (not shown) of the mobile terminal 1 and may be stored in a memory (not shown). In addition, although not shown in the drawings, the camera module may be further disposed on the front of the mobile terminal 1. For example, the camera module 10 may include a first camera module 10A and a second camera module 10B. In this case, at least one of the first camera module 10A and the second camera module 10B may include the above-described optical system 1000. Accordingly, the camera module 10 may have improved aberration characteristics and may have a slim structure. In addition, the mobile terminal 1 may further include an autofocus device 31. The auto focus device 31 may include an auto focus function using a laser. The auto focus device 31 may be mainly used in a condition in which the auto focus function using the image of the camera module 10 is deteriorated, for example, in proximity of 10 m or less or in a dark environment. The autofocus device 31 may include a light emitting unit including a VCSEL (vertical cavity surface emission laser) semiconductor device and a light receiving unit that converts light energy such as a photodiode into electrical energy. Also, the mobile terminal 1 may further include a flash module 33. The flash module 33 may include a light emitting device emitting light therein. The flash module 33 may be operated by a camera operation of a mobile terminal or a user's control.

Features, structures, effects, etc. described in the above embodiments are included in at least one embodiment of the invention, and are not necessarily limited to only one embodiment. Furthermore, features, structures, effects, etc. illustrated in each embodiment may be combined or modified for other embodiments by those of ordinary skill in the art to which the embodiments belong. Accordingly, the contents related to such combinations and modifications should be interpreted as being included in the scope of the invention. In addition, although the embodiment has been described above, it is only an example and does not limit the invention, and those of ordinary skill in the art to which the invention pertains are exemplified above in a range that does not depart from the essential characteristics of the present embodiment. It may be seen that various modifications and applications that have not been made are possible. For example, each component specifically shown in the embodiment may be implemented by modification. And the differences related to these modifications and applications should be construed as being included in the scope of the invention defined in the appended claims.

The invention claimed is:

1. An optical system comprising:
first to seventh lenses sequentially arranged along an optical axis from an object side to an image side,
wherein the first lens has a negative refractive power,
wherein the third lens has a positive refractive power,
wherein an object-side surface of the first lens is concave on a region corresponding to the optical axis,
wherein each of an object-side surface and an image-side surface of the third lens is convex on a region corresponding to the optical axis,
wherein the third lens satisfies the following Equation 1:

$$0.5 < f3/F < 1.5 \quad \text{[Equation 1]}$$

in Equation 1, F means an effective focal length of the optical system, and f3 means a focal length of the third lens,
wherein the second and third lenses satisfy the following Equation 1-1:

$$10 < |L2R1/L3R2| < 300 \quad \text{[Equation 1-1]}$$

in Equation 1-1, L2R1 means a radius of curvature of an object-side surface of the second lens, and L3R2 means a radius of curvature of an image-side surface of the third lens.

2. The optical system of claim 1, wherein the fourth lens has a negative refractive power,
wherein an image-side surface of the fourth lens is concave on a region corresponding to the optical axis, and
wherein an image-side surface of the second lens is convex on a region corresponding to the optical axis.

3. The optical system of claim 2, wherein the third and fourth lenses satisfy the following Equation 2:

$$1 < L3\_CT/L4\_CT < 5 \quad \text{[Equation 2]}$$

(In Equation 2, L3_CT means a center thickness of the third lens, and L4_CT means a center thickness of the fourth lens).

4. The optical system of claim 2, wherein the third and fourth lenses satisfy the following Equation:

$$1 < |f4|/|f3| < 5 \quad \text{[Equation 3]}$$

(In Equation 3, f3 is the focal length of the third lens, and f4 is the focal length of the fourth lens).

5. The optical system of claim 2, wherein the sixth lens has a positive refractive power,
wherein an image side of the sixth lens is a convex.

6. The optical system of claim 5, wherein the fourth and sixth lenses satisfy the following Equation 4:

$$1 < L6\_CT/L4\_CT < 5 \quad \text{[Equation 4]}$$

(In Equation 4, L4_CT means a center thickness of the fourth lens, and L6_CT means a center thickness of the sixth lens).

7. The optical system of claim 2,
wherein the seventh lens has negative refractive power,
wherein an image side of the seventh lens is concave on a region corresponding to the optical axis.

8. The optical system of claim 5, wherein the sixth and seventh lenses satisfy the following Equation 5:

$$0.5 < |f6|/|f7| < 2 \quad \text{[Equation 5]}$$

(In Equation 5, f6 means a focal length of the sixth lens, and f7 means a focal length of the seventh lens).

9. An optical system comprising:
first to seventh lenses sequentially arranged along an optical axis from an object side to an image side, wherein the first lens has a negative refractive power,
wherein the third lens has a positive refractive power,
which each of an object-side surface and an image-side surface of the first lens is concave on a region corresponding to the optical axis,
wherein an image-side surface of the second lens is convex on a region corresponding to the optical axis,
wherein each of an object-side surface and an image-side surface of the third lens is convex on a region corresponding to the optical axis,
wherein the first lens includes a first inflection point disposed on the object-side surface,
wherein the first inflection point is disposed at a position of 25% to 60% with respect to a direction perpendicular to the optical axis, when the optical axis is a starting point and an end point of the object-side surface of the first lens is an end point, and
wherein the second and third lenses satisfy the following Equation 1-1:

$$10<|L2R1/L3R2|<300 \qquad \text{[Equation 1]}$$

in Equation 1-1, L2R1 means a radius of curvature of an object-side surface of the second lens, and L3R2 means a radius of curvature of an image-side surface of the third lens.

10. The optical system of claim 9, wherein at least one of an object-side surface and an image-side surface of the seventh lens includes an inflection point.

11. The optical system of claim 10, wherein the seventh lens comprises a second inflection point disposed on the object-side surface,
wherein the second inflection point is disposed at a position of 25% to 55% with respect to a direction perpendicular to the optical axis, when the optical axis is a starting point and an end of the object-side surface of the seventh lens is an end point.

12. The optical system of claim 11, wherein the seventh lens comprises a third inflection point disposed on the image-side surface,
wherein the third inflection point is disposed at a position of 55% to 90% with respect to the direction perpendicular to the optical axis, when the optical axis is the starting point and an end point of the image-side surface of the seventh lens is an end point.

13. The optical system of claim 12, wherein a distance between the optical axis and the third inflection point in the direction perpendicular to the optical axis is greater than a distance between the optical axis and the second inflection point.

14. The optical system of claim 1, wherein the object-side surface of the second lens is convex on a region corresponding to the optical axis, and an image-side surface of the second lens is convex on a region corresponding to the optical axis.

15. The optical system of claim 1, wherein the object-side surface of the second lens is concave on a region corresponding to the optical axis,
wherein a center thickness of the first lens is L1_CT,
wherein a center thickness of the second lens is L2_CT, and
wherein the optical system satisfies the following Equation:

$$0.5<L1\_CT/L2\_CT<2.5. \qquad \text{Equation:}$$

16. The optical system of claim 1,
wherein an image-side surface of the second lens is convex on a region corresponding to an optical axis,
wherein a center thickness of the second lens is L2_CT,
wherein a center thickness of the third lens is L3_CT, and
wherein the optical system satisfies the following Equation:

$$0<L2\_CT/L3\_CT<1. \qquad \text{[Equation]}$$

17. The optical system of claim 1,
wherein an image-side surface of the second lens is convex on a region corresponding to an optical axis,
wherein a center thickness of the third lens is L3_CT,
wherein a center thickness of the fourth lens is L4_CT, and
wherein the optical system satisfies the following Equation:

$$1.5<L3\_CT/L4\_CT<3.5. \qquad \text{[Equation]}$$

18. The optical system of claim 9, wherein the object-side surface of the second lens is convex on a region corresponding to the optical axis,
wherein a center thickness of the first lens is L1_CT,
wherein a center thickness of the second lens is L2_CT, and
wherein the optical system satisfies the following Equation:

$$0.5<L1\_CT/L2\_CT<2.5. \qquad \text{Equation:}$$

19. The optical system of claim 9,
wherein the object-side surface of the second lens is concave on a region corresponding to the optical axis,
wherein a center thickness of the second lens is L2_CT,
wherein a center thickness of the third lens is L3_CT, and
wherein the optical system satisfies the following Equation:

$$0<L2\_CT/L3\_CT<1. \qquad \text{[Equation]}$$

20. The optical system of claim 9,
wherein the fifth lens has a meniscus shape in which a region corresponding to the optical axis is convex toward the object side.

* * * * *